United States Patent
Drach et al.

(10) Patent No.: US 12,480,941 B2
(45) Date of Patent: Nov. 25, 2025

(54) RAPID MOBILE SCREENING AND TRIAGE FOR INFECTIONS AND INFECTION SEVERITY

(71) Applicant: Advanced Animal Diagnostics, Inc., Morrisville, NC (US)

(72) Inventors: Joy Parr Drach, Pontiac, IL (US);
Brendan Smith, Cary, NC (US);
Tobias M. Heineck, Durham, NC (US);
Stefano Bresolin, Garner, NC (US);
Rodolfo R. Rodriguez, Cary, NC (US);
Danielle Stewart Noel, Raleigh, NC (US); Brian Pike, Durham, NC (US);
Oleg Kakhovsky, Raleigh, NC (US);
Jasper N. Pollard, Durham, NC (US)

(73) Assignee: Advanced Animal Diagnostics, Inc., Morrisville, NC (US)

( * ) Notice: Subject to any disclaimer, the term of this patent is extended or adjusted under 35 U.S.C. 154(b) by 493 days.

(21) Appl. No.: 17/905,990

(22) PCT Filed: Mar. 12, 2021

(86) PCT No.: PCT/US2021/022167
§ 371 (c)(1),
(2) Date: Sep. 9, 2022

(87) PCT Pub. No.: WO2021/183927
PCT Pub. Date: Sep. 16, 2021

(65) Prior Publication Data
US 2023/0096475 A1    Mar. 30, 2023

Related U.S. Application Data

(60) Provisional application No. 62/989,283, filed on Mar. 13, 2020.

(51) Int. Cl.
*G01N 33/50* (2006.01)
*G01N 15/05* (2006.01)
(Continued)

(52) U.S. Cl.
CPC ......... *G01N 33/5094* (2013.01); *G01N 15/05* (2013.01); *G01N 15/1433* (2024.01);
(Continued)

(58) Field of Classification Search
CPC ............... G01N 33/5094; G01N 33/49; G01N 15/1433; G01N 15/05; G01N 2201/0221
(Continued)

(56) References Cited

U.S. PATENT DOCUMENTS 8,224,058 B2    7/2012 Lindberg et al.
10,341,551 B1 *  7/2019 Pellikka ............... G02B 21/241
(Continued)

FOREIGN PATENT DOCUMENTS

CN    111366525 A  *  7/2020  ............. G01N 15/14
EP    3586726 A1       1/2020
(Continued)

OTHER PUBLICATIONS

"Extended European Search Report corresponding to European Application No. 21767127.0 dated Feb. 13, 2024".
(Continued)

*Primary Examiner* — Jamares Q Washington
(74) *Attorney, Agent, or Firm* — Myers Bigel, P.A.

(57) ABSTRACT

A method of analyzing a blood sample from a subject includes loading the blood sample into a single chamber; acquiring, via an imaging system, a stack of serial focal plane images of the blood sample from a plurality of fields of view of the chamber; creating a virtual three dimensional image of the blood sample from selected ones of the stacks of serial focal plane images; and analyzing the virtual three
(Continued)

dimensional image to identify blood formed elements within the blood sample. Identifying blood formed elements within the blood sample may include identifying a type and amount of white blood cells, and/or identifying an amount of red blood cells and/or hematocrit, and/or identifying an amount of platelets. Identifying blood formed elements within the blood sample may include determining numbers and percentage by volume in the blood sample of one or more types of white blood cells.

20 Claims, 13 Drawing Sheets

(51) Int. Cl.
*G01N 15/1433* (2024.01)
*G01N 21/64* (2006.01)
*G01N 33/49* (2006.01)

(52) U.S. Cl.
CPC ......... *G01N 21/6458* (2013.01); *G01N 33/49* (2013.01); *G01N 2201/0221* (2013.01)

(58) Field of Classification Search
USPC .................................................. 382/134, 133
See application file for complete search history.

(56) References Cited

U.S. PATENT DOCUMENTS

| | | | |
|---|---|---|---|
| 2005/0260766 A1* | 11/2005 | Paul | G01N 15/1459 436/500 |
| 2007/0139541 A1 | 6/2007 | Fein et al. | |
| 2011/0053210 A1* | 3/2011 | Matsumoto | G01N 33/49 435/288.7 |
| 2011/0261164 A1* | 10/2011 | Olesen | G01N 17/00 382/128 |
| 2015/0031051 A1* | 1/2015 | Mohan | G02B 7/09 359/383 |
| 2017/0161545 A1 | 6/2017 | Champlin et al. | |
| 2019/0348182 A1* | 11/2019 | Magari | G01N 15/1429 |

FOREIGN PATENT DOCUMENTS

| | | |
|---|---|---|
| KR | 101805152 B1 | 12/2017 |
| WO | 2017168411 A1 | 10/2017 |

OTHER PUBLICATIONS

"International Search Report and Written Opinion corresponding International Application No. PCT/US2021/022167 mailed Jun. 28, 2021".

"International Preliminary Report on Patentability corresponding International Application No. PCT/US2021/022167 mailed Sep. 22, 2022".

* cited by examiner

Image Stack

RAPID MOBILE SCREENING AND TRIAGE FOR INFECTIONS AND INFECTION SEVERITY

STATEMENT OF PRIORITY

This application is a 35 U.S.C. § 371 national phase application of PCT Application PCT/US2021/022167 filed Mar. 13, 2021, which claims the benefit of U.S. Provisional Application Ser. No. 62/989,283, filed Mar. 13, 2020, the entire contents of each of which are incorporated by reference herein.

BACKGROUND

The Covid 19 pandemic has highlighted limitations in the healthcare system on its ability to deliver host-based, accurate diagnostic information about an individual's health and immune system status, especially infections, in a timely manner. Adverse outcomes can arise from almost any infection, and lack of ability to predict or identify these complications early when infection is present may create a challenge to effective patient management, as well as a failure to appropriately allocate resources.

In the current pandemic, the great majority of individuals infected with SARS-CoV-2 have a mild illness, a smaller percentage experience moderately severe disease, and only very few require critical care. It has been challenging for hospitals, overwhelmed with patients and limited in resources, to quickly and accurately identify patients who require hospital admission or ICU care and separate them from those at low risk of complications, who can be sent home or to a lower-level care facility. Triage decisions by necessity may have been made based on subjective, ad-hoc clinical judgment.

Sepsis is one the most common severe complication of COVID-19 infection, or any other infection, representing the host's extreme response to that infection, and may eventually lead to organ dysfunction and death. Individual comorbidities, pathogen, genotype, phenotype as well as the relative strength of the individual immune system, may cause the response to infection to vary substantially among patients. This heterogeneity of response may make it difficult for triage personnel to determine infection severity, or disease progression, possibly delaying successful intervention.

The inability to quickly determine infection severity and properly triage infected patients who are at higher risk for health deterioration, sepsis or poor outcomes, adversely affects the health care system's ability to provide the required and timely care to patients who need it. This is especially true in certain areas of the country, where rapid host-based diagnostic testing is scarce, and a disproportionate amount of these areas are in rural and low-income areas. When tests are available, they cannot always differentiate those who must be rushed to a hospital from those who can be sent home or can self-quarantine.

The need for rapid information is especially important in transient populations, such as homeless shelters, where caregivers may not be able to find the patient later to provide results. Results must be available patient-side in a matter of seconds. In addition, the equipment needed to provide results must be robust enough to operate in a variety of point-of-care settings including outdoor or drive-through testing facilities.

It would be highly desirable to be able to recognize infection severity at early points in its progression in order to allow for tailored intervention to reduce adverse outcomes.

SUMMARY

In one aspect, the present disclosure provides a method of analyzing a blood sample from a subject that includes loading the blood sample into a single chamber; acquiring, via an imaging system, a stack of serial focal plane images of the blood sample from a plurality of fields of view of the chamber; creating a virtual three dimensional image of the blood sample from selected ones of the stacks of serial focal plane images; and analyzing the virtual three dimensional image to identify blood formed elements within the blood sample. In some embodiments, the plurality of fields of view comprise at least twenty-five fields of view, preferably at least fifty fields of view, and even more preferably at least one hundred fields of view. In some embodiments, the method is performed by a portable automated microscope apparatus at a location of the subject.

In some embodiments, analyzing the virtual three dimensional image to identify blood formed elements within the blood sample comprises identifying a type and amount of white blood cells, and/or identifying an amount of red blood cells and/or hematocrit, and/or identifying an amount of platelets.

In some embodiments, analyzing the virtual three dimensional image to identify blood formed elements within the blood sample comprises determining numbers and percentage by volume in the blood sample of one or more types of white blood cells. The one or more types of white blood cells may be selected from the following: lymphocytes, neutrophils, eosinophils, basophils, monocytes, bands, and immature granulocytes. The immature granulocytes may include band neutrophils, metamyelocytes, myelocytes, and blasts.

In some embodiments, analyzing the virtual three dimensional image to identify blood formed elements within the blood sample comprises determining a ratio in the blood sample of two or more types of blood formed elements. Exemplary ratios includes the ratio of neutrophils to lymphocytes, neutrophils to platelets, and lymphocytes to platelets.

In some embodiments, the method of analyzing a blood sample may further include using the determined numbers, percentage by volume, and ratios in the blood sample of the one or more types of formed elements, e.g., white blood cells to output relevant hematology measurands and clinical information, such as likelihood and severity of infection.

In some embodiments, acquiring the stack of serial focal plane images in each field of view comprises focusing the imaging system on an initial focal plane of the blood sample within the respective field of view, and then acquiring images at different focal planes along the Z direction. Optical information from at least one image in a stack of images of a first field of view may be used to select optical parameters utilized during the acquiring of a stack of serial focal plane images in a second, subsequent field of view. Exemplary optical parameters comprise one or more of the following: exposure time, camera gains, and illumination intensity.

In some embodiments, the chamber comprises at least one metachromatic stain in a dry format, and the imaging system comprises a red-green-blue (RGB) detector sensitive to light across the visible spectrum. For example, a first stain may be utilized that is configured to enhance cell membrane fluorescence and cytoplasm fluorescence, and a second stain may be utilized that is configured to enhance nuclear fluorescence. The independent RGB channels of the RGB detector are used to create the virtual three dimensional image of the blood sample from the selected ones of the stacks of serial focal plane images.

In some embodiments, analyzing the virtual three dimensional image to identify blood formed elements within the blood sample comprises processing the virtual three dimensional image using machine vision segmentation.

According to other aspects, the present disclosure provides a method of managing a subject suspected of having an infection, comprising: a) carrying out the method of analyzing a blood sample as described above; b) classifying the subject as: 1) unlikely to have an infection; 2) likely to have an infection; or 3) likely to have an infection with severe symptoms based on the results of step a); and c) managing the subject based on the results of step b).

According to other aspects, the present disclosure provides a method of managing a subject suspected of having a SARS-CoV2 infection, comprising: a) carrying out the method of analyzing a blood sample as described above; b) classifying the subject as: 1) unlikely to have a SARS-CoV2 infection; 2) likely to have a SARS-CoV2 infection; or 3) likely to have a SARS-CoV2 infection with severe symptoms based on the results of step a); and c) managing the subject based on the results of step b). In some embodiments steps a) and b) combined are carried out in less than 2 minutes. In some embodiments, step a) does not comprise the use of cell surface markers. In some embodiments, the method does not comprise a step of cell lysis. In some embodiments, step b) further comprises incorporating the results of additional tests or measurements. In some embodiments, steps a) and b) are carried out in close proximity to the subject. In some embodiments, steps a) and b) are carried out in a hospital emergency room, in an ambulance, in a nursing home, or in the subject's home or workplace. In some embodiments, step c) comprises sending or keeping the subject home, continuing monitoring of the subject, performing additional tests on the subject, admitting the subject to a hospital, or admitting the subject to a hospital intensive care unit. In some embodiments, step c) comprises maintaining current treatment, changing treatment, or ending treatment.

According to other aspects, the present disclosure provides a method of managing a subject suspected of having sepsis, comprising: a) carrying out the method of analyzing a blood sample as described above; b) classifying the subject as: 1) unlikely to have sepsis; 2) likely to have sepsis; or 3) likely to have sepsis with severe symptoms based on the results of step a); and c) managing the subject based on the results of step b). In some embodiments steps a) and b) combined are carried out in less than 2 minutes. In some embodiments, step a) does not comprise the use of cell surface markers. In some embodiments, the method does not comprise a step of cell lysis. In some embodiments, step b) further comprises incorporating the results of additional tests or measurements. In some embodiments, steps a) and b) are carried out in close proximity to the subject. In some embodiments, steps a) and b) are carried out in a hospital emergency room, in an ambulance, in a nursing home, or in the subject's home or workplace. In some embodiments, step c) comprises sending or keeping the subject home, continuing monitoring of the subject, performing additional tests on the subject, admitting the subject to a hospital, or admitting the subject to a hospital intensive care unit. In some embodiments, step c) comprises maintaining current treatment, changing treatment, or ending treatment.

According to other aspects, the present disclosure provides a method of managing a subject having an infection, comprising: a) carrying out the method of analyzing a blood sample as described above at least two times; b) classifying the subject as: 1) no change in the infection; 2) improving of the infection; or 3) worsening of the infection based on the results of step a); and c) managing the subject based on the results of step b). In some embodiments steps a) and b) combined are carried out in less than 2 minutes. In some embodiments, step a) does not comprise the use of cell surface markers. In some embodiments, the method does not comprise a step of cell lysis. In some embodiments, step b) further comprises incorporating the results of additional tests or measurements. In some embodiments, steps a) and b) are carried out in close proximity to the subject. In some embodiments, steps a) and b) are carried out in a hospital emergency room, in an ambulance, in a nursing home, or in the subject's home or workplace. In some embodiments, step c) comprises sending or keeping the subject home, continuing monitoring of the subject, performing additional tests on the subject, admitting the subject to a hospital, or admitting the subject to a hospital intensive care unit. In some embodiments, step c) comprises maintaining current treatment, changing treatment, or ending treatment.

According to other aspects, the present disclosure provides a method of managing a subject having a SARS-CoV2 infection, comprising: a) carrying out the method of analyzing a blood sample as described above at least two times; b) classifying the subject as: 1) no change in the SARS-CoV2 infection; 2) improving of the SARS-CoV2 infection; or 3) worsening of the SARS-CoV2 infection based on the results of step a); and c) managing the subject based on the results of step b). In some embodiments steps a) and b) combined are carried out in less than 2 minutes. In some embodiments, step a) does not comprise the use of cell surface markers. In some embodiments, the method does not comprise a step of cell lysis. In some embodiments, step b) further comprises incorporating the results of additional tests or measurements. In some embodiments, steps a) and b) are carried out in close proximity to the subject. In some embodiments, steps a) and b) are carried out in a hospital emergency room, in an ambulance, in a nursing home, or in the subject's home or workplace. In some embodiments, step c) comprises sending or keeping the subject home, continuing monitoring of the subject, performing additional tests on the subject, admitting the subject to a hospital, or admitting the subject to a hospital intensive care unit. In some embodiments, step c) comprises maintaining current treatment, changing treatment, or ending treatment.

According to other aspects, the present disclosure provides a method of managing a subject having sepsis, comprising: a) carrying out the method of analyzing a blood sample as described above at least two times; b) classifying the subject as: 1) no change in the sepsis; 2) improving of the sepsis; or 3) worsening of the sepsis based on the results of step a); and c) managing the subject based on the results of step b). In some embodiments steps a) and b) combined are carried out in less than 2 minutes. In some embodiments, step a) does not comprise the use of cell surface markers. In some embodiments, the method does not comprise a step of cell lysis. In some embodiments, step b) further comprises incorporating the results of additional tests or measurements. In some embodiments, steps a) and b) are carried out in close proximity to the subject. In some embodiments, steps a) and b) are carried out in a hospital emergency room, in an ambulance, in a nursing home, or in the subject's home or workplace. In some embodiments, step c) comprises sending or keeping the subject home, continuing monitoring of the subject, performing additional tests on the subject, admitting the subject to a hospital, or admitting the subject to a hospital intensive care unit. In some embodiments, step c) comprises maintaining current treatment, changing treatment, or ending treatment.

According to other aspects, the present disclosure provides a method of monitoring a subject for a potential infection, comprising: a) carrying out the method of analyzing a blood sample as described above; b) classifying the subject as: 1) unlikely to have an infection; 2) likely to have an infection; or 3) likely to have an infection with severe symptoms based on the results of step a); and c) managing the subject based on the results of step b). In some embodiments, the subject has no symptoms of an infection. In some embodiments, the method is carried out on the subject more than once to monitor for the appearance of an infection. In some embodiments steps a) and b) combined are carried out in less than 2 minutes. In some embodiments, step a) does not comprise the use of cell surface markers. In some embodiments, the method does not comprise a step of cell lysis. In some embodiments, step b) further comprises incorporating the results of additional tests or measurements. In some embodiments, steps a) and b) are carried out in close proximity to the subject. In some embodiments, steps a) and b) are carried out in a hospital emergency room, in an ambulance, in a nursing home, or in the subject's home or workplace. In some embodiments, step c) comprises sending or keeping the subject home, continuing monitoring of the subject, performing additional tests on the subject, admitting the subject to a hospital, or admitting the subject to a hospital intensive care unit. In some embodiments, step c) comprises maintaining current treatment, changing treatment, or ending treatment.

According to other aspects, the present disclosure provides a method of carrying out a hematology screen of a subject prior to a medical procedure, comprising: a) carrying out the method of analyzing a blood sample as described above; b) classifying the subject as: 1) suitable for the medical procedure; or 2) unsuitable for the medical procedure based on the results of step a); and c) carrying out the medical procedure if the subject is classified as suitable. In some embodiments, the medical procedure is chemotherapy. In some embodiments steps a) and b) combined are carried out in less than 2 minutes. In some embodiments, step a) does not comprise the use of cell surface markers. In some embodiments, the method does not comprise a step of cell lysis. In some embodiments, step b) further comprises incorporating the results of additional tests or measurements. In some embodiments, steps a) and b) are carried out in close proximity to the subject. In some embodiments, step c) comprises sending or keeping the subject home, continuing monitoring of the subject, performing additional tests on the subject, admitting the subject to a hospital, or admitting the subject to a hospital intensive care unit. In some embodiments, step c) comprises maintaining current treatment, changing treatment, or ending treatment.

According to other aspects, the present disclosure provides a portable apparatus, comprising: a processor; a hematology analyzer in communication with the processor; and a tangible, non-transitory memory configured to communicate with the processor, the tangible, non-transitory memory having instructions stored thereon that, in response to execution by the processor, cause the processor to perform operations comprising: receiving from the hematology analyzer, a stack of serial focal plane images of a blood sample in a chamber from a plurality of fields of view of the chamber; creating a virtual three dimensional image of the blood sample from selected ones of the stacks of serial focal plane images; and analyzing the virtual three dimensional image to identify blood formed elements within the blood sample.

In some embodiments, analyzing the virtual three dimensional image to identify blood formed elements within the blood sample comprises identifying a type and amount of white blood cells, and/or identifying an amount of red blood cells and/or hematocrit, and/or identifying an amount of platelets.

In some embodiments, analyzing the virtual three dimensional image to identify blood formed elements within the blood sample comprises determining numbers and percentage by volume in the blood sample of one or more types of white blood cells. The one or more types of white blood cells may be selected from the following: lymphocytes, neutrophils, eosinophils, basophils, monocytes, bands and immature granulocytes. The immature granulocytes may include band neutrophils, metamyelocytes, myelocytes, and blasts.

In some embodiments, analyzing the virtual three dimensional image to identify blood formed elements within the blood sample comprises determining ratio in the blood sample of two or more types of formed elements, e.g., white blood cells, e.g., determining the ratio of neutrophils to lymphocytes, etc.

In some embodiments, the tangible, non-transitory memory further has instructions stored thereon that, in response to execution by the processor, cause the processor to perform operations comprising using the determined numbers, percentage by volume, and ratios in the blood sample of the one or more types of formed elements to determine a likelihood that the subject has an infection and/or a severity of the infection.

In some embodiments, the tangible, non-transitory memory further has instructions stored thereon that, in response to execution by the processor, cause the processor to perform operations comprising using optical information from at least one image in a stack of images of a first field of view to select optical parameters utilized during the acquiring of a stack of serial focal plane images in a second, subsequent field of view. Exemplary optical parameters include one or more of the following: exposure time, camera gains, and illumination intensity.

In some embodiments, the chamber comprises at least one metachromatic stain in a dry format, and the imaging system comprises a red-green-blue (RGB) detector sensitive to light across the visible spectrum. For example, a first stain may be utilized that is configured to enhance cell membrane fluorescence and cytoplasm fluorescence, and a second stain may be utilized that is configured to enhance nuclear fluorescence. The independent RGB channels of the RGB detector are used to create the virtual three dimensional image of the blood sample from the selected ones of the stacks of serial focal plane images.

According to other aspects, the present disclosure provides an article of manufacture, comprising: a non-transitory, machine-readable memory having instructions recorded thereon that, when executed on a processor, cause the processor to perform operations comprising: receiving from a hematology analyzer, a stack of serial focal plane images of a subject's blood sample in a chamber from a plurality of fields of view of the chamber; creating a virtual three dimensional image of the blood sample from selected ones of the stacks of serial focal plane images; and analyzing the virtual three dimensional image to identify blood formed elements within the blood sample.

In some embodiments, the machine readable memory has instructions recorded thereon that, when executed on the processor, cause the processor to identify a type and amount of white blood cells, and/or identify an amount of red blood cells and/or hematocrit, and/or identify an amount of platelets.

In some embodiments, the machine readable memory has instructions recorded thereon that, when executed on the processor, cause the processor to determine numbers and percentage by volume in the blood sample of one or more types of white blood cells. The one or more types of white blood cells may be selected from the following: lymphocytes, neutrophils, eosinophils, basophils, monocytes, bands, and immature granulocytes. The immature granulocytes may include band neutrophils, metamyelocytes, myelocytes, and blasts.

In some embodiments, analyzing the virtual three dimensional image to identify blood formed elements within the blood sample comprises determining ratio in the blood sample of two or more types of formed elements, e.g., white blood cells, e.g., determining the ratio of neutrophils to lymphocytes, etc.

In some embodiments, the machine readable memory has instructions recorded thereon that, when executed on the processor, cause the processor to determine a likelihood that the subject has an infection and/or a severity of the infection.

In some embodiments, the machine readable memory has instructions recorded thereon that, when executed on the processor, cause the processor to use optical information from at least one image in a stack of images of a first field of view to select optical parameters utilized during the acquiring of a stack of serial focal plane images in a second, subsequent field of view. Exemplary optical parameters include one or more of the following: exposure time, camera gains, and illumination intensity.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate various embodiments of the present invention. The drawings and description together serve to fully explain embodiments of the present invention.

FIG. 2A is a cross-sectional view of the cartridge of FIG. 2 taken along line 2A-2A.

DETAILED DESCRIPTION

Figure 1:
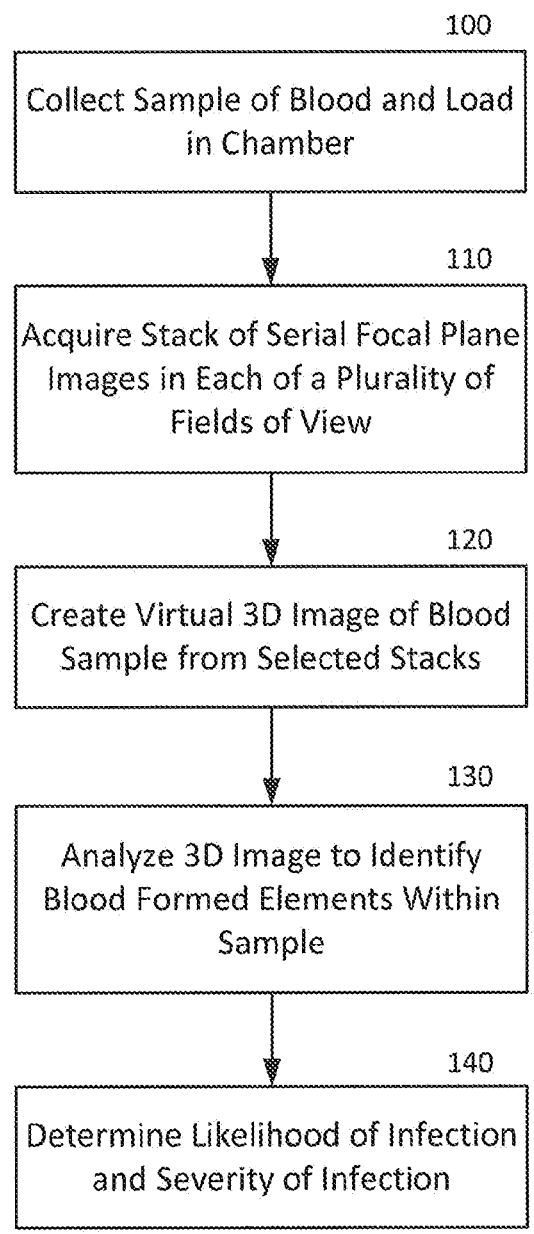
FIG. 1 is a flow diagram of methods of identifying blood formed elements within a blood sample from a patient and for determining a likelihood of the patient having an infection according to some embodiments of the present invention.

The present inventions are now described more fully hereinafter with reference to the accompanying drawings, in which embodiments of the invention are shown. The inventions may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

As used in the description of the invention and the appended claims, the singular forms "a," "an" and "the" are intended to include the plural forms as well, unless the context clearly indicates otherwise. For example, "a cell" can mean a single cell or a multiplicity of cells.

Also as used herein, "and/or" refers to and encompasses any and all possible combinations of one or more of the associated listed items, as well as the lack of combinations when interpreted in the alternative ("or").

As used herein, the transitional phrase "consisting essentially of" (and grammatical variants) is to be interpreted as encompassing the recited materials or steps and those that do not materially affect the basic and novel characteristic(s) of the claimed invention. Thus, the term "consisting essentially of" as used herein should not be interpreted as equivalent to "comprising."

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

The term "about," as used herein when referring to a measurable value such as an amount or concentration (e.g., the absolute amount of a cell type) and the like, is meant to encompass variations of 10%, 5%, 1%, 0.5%, 0.4% 0.3%, 0.2% or 0.1% of the specified value.

Unless the context indicates otherwise, it is specifically intended that the various features of the invention described herein can be used in any combination. For example, features described in relation to one embodiment may also be applicable to and combinable with other embodiments and aspects of the invention.

Moreover, the present invention also contemplates that in some embodiments of the invention, any feature or combination of features set forth herein can be excluded or omitted. To illustrate, if the specification states that a complex comprises components A, B and C, it is specifically intended that any of A, B or C, or a combination thereof, can be omitted and disclaimed.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. The terminology used in the description of the invention herein is for the purpose of describing particular embodiments only and is not intended to be limiting of the invention.

All publications, patent applications, patents and other non-patent references mentioned herein are incorporated by reference herein in their entirety.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

Various embodiments of the present disclosure provide, among other things, a rapid test that can conveniently be run at a location of a subject, e.g., a patient (such as at a hospital emergency room, in an ambulance, at a doctor's office, at a nursing home, at the subject's home or workplace, etc.) to determine a likelihood that the subject is likely to have an infection and/or a severe infection. In various embodiments, the methods of the present invention disclosure can be carried out in an average time of not more than about 120, 90, 60, or 30 seconds. Further, the methods can identify and quantity immature cells, including bands, that are too similar to mature blood cells to be detected be previous hematology analyzers. Moreover, the methods of the present invention can be performed by unskilled personnel, relieving the strain on medical professionals, and flagging those subjects who need more resource-intensive confirmatory testing and/or more immediate or intensive care.

With reference to FIG. 1, a method of identifying blood formed elements within a blood sample from a subject and using that information to determine a likelihood the subject has an infection is illustrated. Blood formed elements, as used herein, refers to the solid components of blood, including cells and cell fragments, and excluding soluble components, small molecules, proteins, etc. Initially, a blood sample is collected from a patient and loaded into a chamber of an automated microscope cartridge (Block 100). A sample of blood may be obtained from a person via any suitable technique with any suitable apparatus, such as a lance, hollow needle, syringe, capillary action chamber, or combination thereof. Less than 10 µL of whole blood is needed and typically an imaging volume of only 0.5 µL is needed.

Examples of automated microscope cartridges and automated microscope readers that may be adapted to carry out embodiments of the present invention include those described in U.S. Pat. No. 10,359,614 to Bresolin et al., the disclosure of which is incorporated by reference herein in its entirety. An exemplary automated microscope reader includes the QSCOUT® reader commercially available from Advanced Animal Diagnostics (Morrisville, North Carolina, USA).

Figure 2:
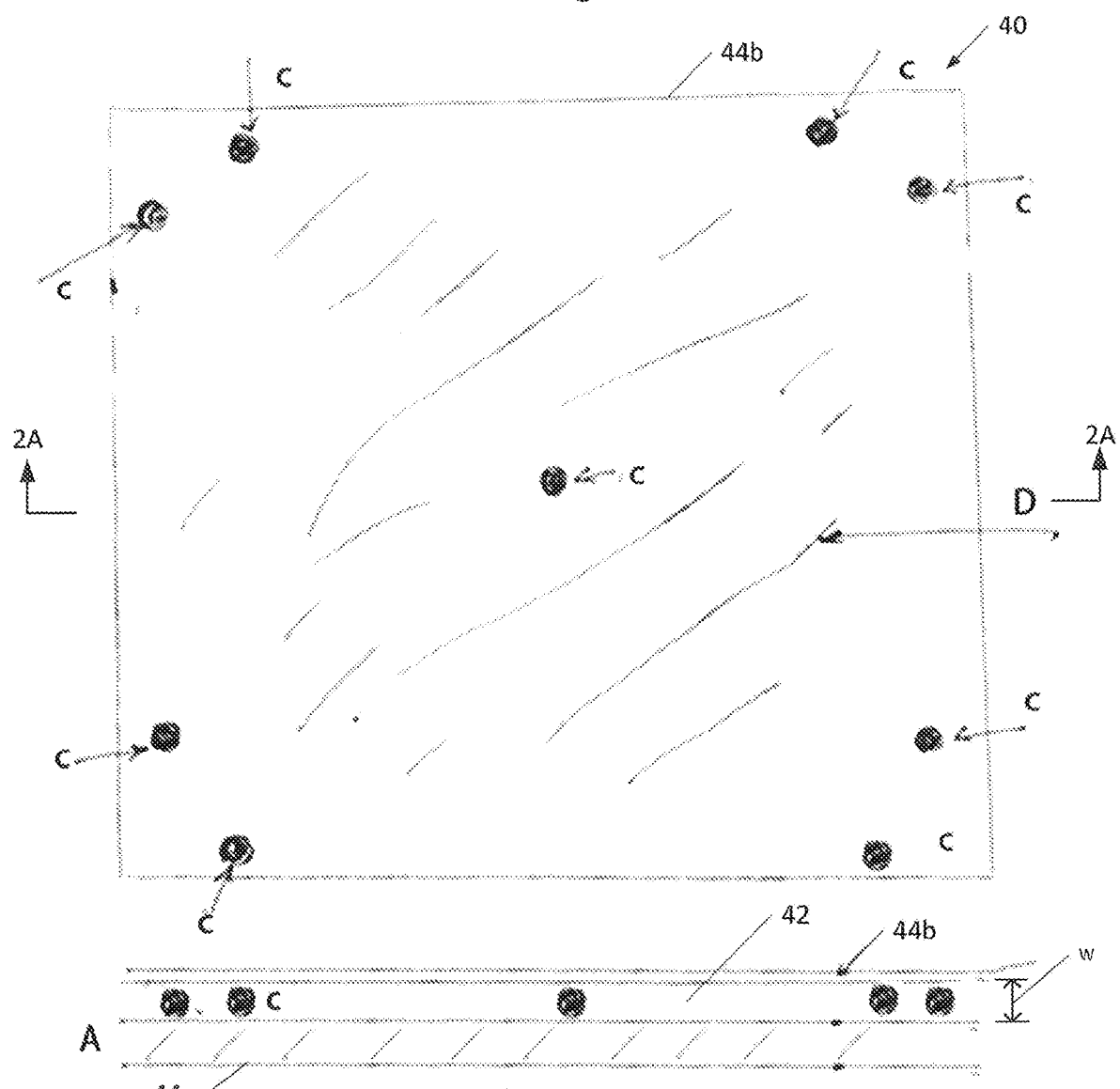
FIG. 2 is a schematic plan view of a portion of an automated microscope cartridge that may be utilized in accordance with various embodiments of the present invention.

A portion of an exemplary microscope cartridge 40 is illustrated in FIGS. 2 and 2A and includes a bottom portion or base 44a, an optically transparent top portion 44b (a "cover slip" or "window"), a chamber 42 therebetween, and a port (not shown) in fluid communication with that chamber for filling the chamber 42 with a blood sample. Typically, the chamber 42 is defined by two plates in parallel, spaced apart relationship of between about ten microns and twenty five microns (10µ-25µ), as indicated by "w" in FIG. 2A. Spacers C, such as glass beads, may be used to maintain the desired spacing between the cover slip 44b and base 44a, according to some embodiments. However, various ways of maintaining the spacing between the base 44a and the cover slip 44b may be utilized without limitation. Exemplary cartridges that may be utilized in accordance with embodiments of the present invention are described in U.S. Pat. No. 4,790,640 which is incorporated herein by reference in its entirety.

The chamber 42 may include a dry stain mixture D that facilitates visualizing the various cells in the blood sample under epifluorescent microscopy. In some embodiments, a mixture of two metachromatic fluorescent stains are contained within the chamber 42. The first stain maximizes membrane and cytoplasm fluorescence, and the second stain maximizes nuclear fluorescence. The stains are provided in a dry format within the chamber 42.

When inserted into an automated microscope apparatus, imaging of blood formed elements in the sample can be carried out through the "window" or "cover slip," and types, percentages, and ratios of blood formed elements contained in the sample can be generated automatically from those images, as will be described below.

Figure 3:
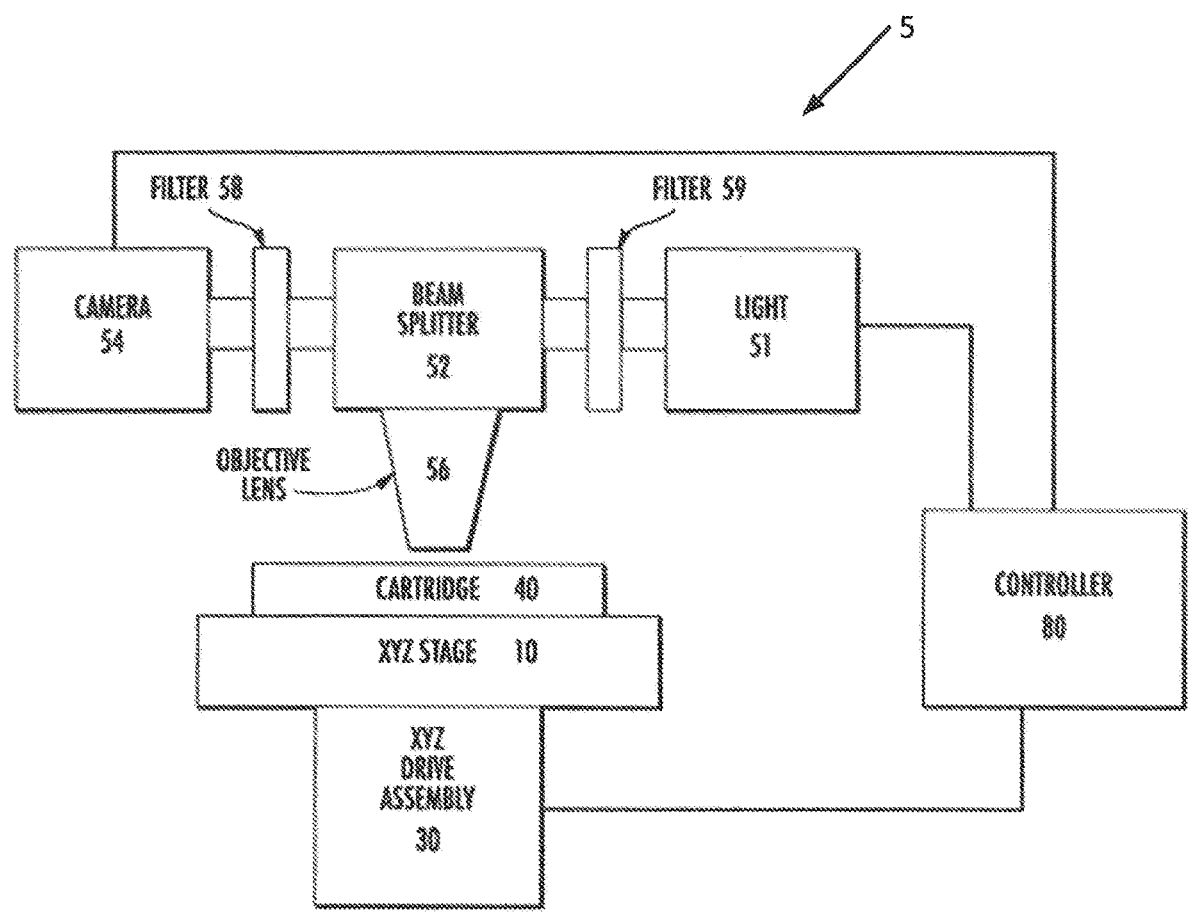
FIG. 3 is a schematic diagram of a portion of an exemplary portable automated microscope apparatus that may be utilized to identify blood formed elements within a blood sample from a patient according to some embodiments of the present invention.

A schematic diagram of a portion of an exemplary portable automated microscope apparatus 5 that may be utilized to identify blood formed elements within a blood sample from a patient, according to some embodiments of the present invention, is illustrated in FIG. 3. The apparatus 5 comprises an XYZ stage 10 mounted on an XYZ drive assembly 30. A sample cartridge 40 is removably inserted into or engaged by the XYZ stage. The optical components of the imaging system (also referred to as an imaging reader) for carrying out epifluorescent microscopy include a light or light source 51, a beam splitter 52, an imaging sensor or camera 54, and an objective lens 56, all configured so that light from the source is directed onto the sample cartridge 40, and light emitted or fluoresced from the sample cartridge is directed to the camera 54. The imaging sensor or camera 54 may be any suitable imaging device, such as a CCD/CMOS device, and may detect and produce digital images and/or intensity values of various signals. The imaging sensor or camera 54 may include an RGB detector that is sensitive to light across the visible spectrum, and that acquires images through respective RGB channels. Filters 58, 59 are provided between the camera and beam splitter, and between the light source and beam splitter, so that the appropriate wavelengths of light are directed onto the sample cartridge, and the appropriate wavelengths of light are directed onto the camera. All components including the camera, light, and XYZ drive assembly, are controlled by any suitable controller 80, which may comprise a computer or microprocessor with associated memory units, power, and additional control boards (not always shown) such as an XYZ controller board. Embodiments of the present invention include an algorithm for closed loop control of the camera and movement parameters for the XYZ drive assembly while imaging two dimensional slices of the three dimensional chamber 42.

Figure 4:
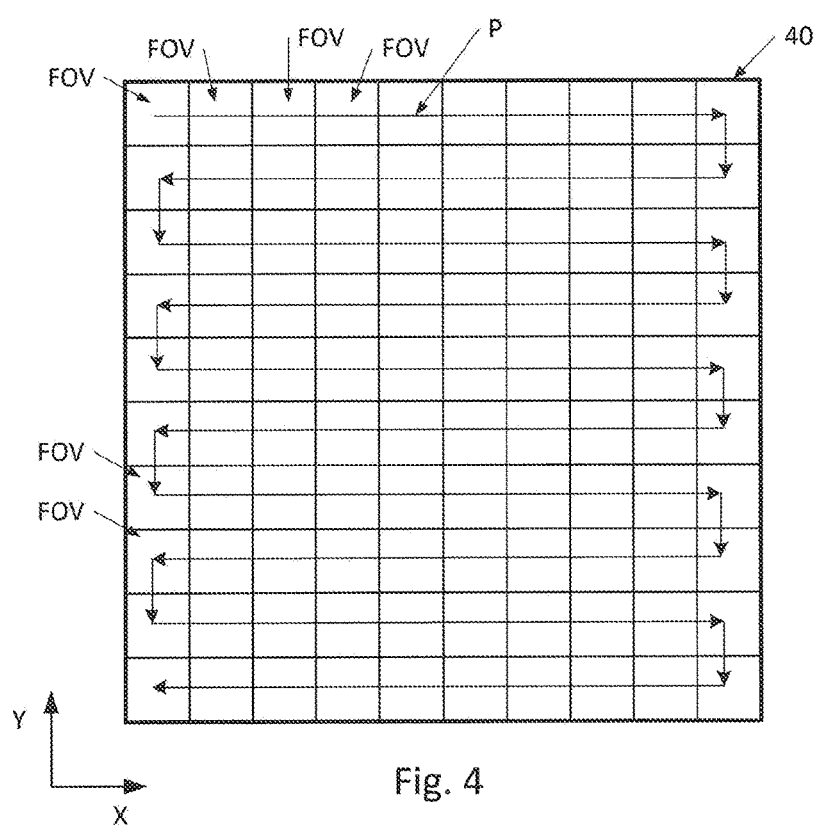
FIG. 4 is a schematic plan view of a chamber of a microscope cartridge illustrating a plurality of field of views from which stacks of images are acquired in accordance with some embodiments of the present invention.

Referring back to FIG. 1, the sample cartridge 40 containing a blood sample within a chamber 42 thereof is loaded within an automated microscope apparatus and the imaging system of the apparatus acquires a stack of serial focal plane images of the blood sample in each of a plurality of fields of view of the chamber 42 (Block 110). The chamber 42 is divided into a matrix of field of views, such as that illustrated in FIG. 4. In FIG. 4, a top view of the chamber 42 is schematically divided into one hundred (100) fields of view (FOV). The XY coordinates for the FOVs are illustrated and the Z direction is into the paper. Images may be acquired from each of the FOVs by the imaging system in a predetermined pattern. For example, images are acquired at a first FOV and then images are acquired from a second FOV, etc., along a predetermined path or pattern. FIG. 4 illustrates an exemplary pattern P of movement between FOVs that may be utilized. However, various patterns of movement may be utilized to acquire images from the FOVs, and embodiments of the present invention are not limited to the illustrated pattern P.

Figure 5:
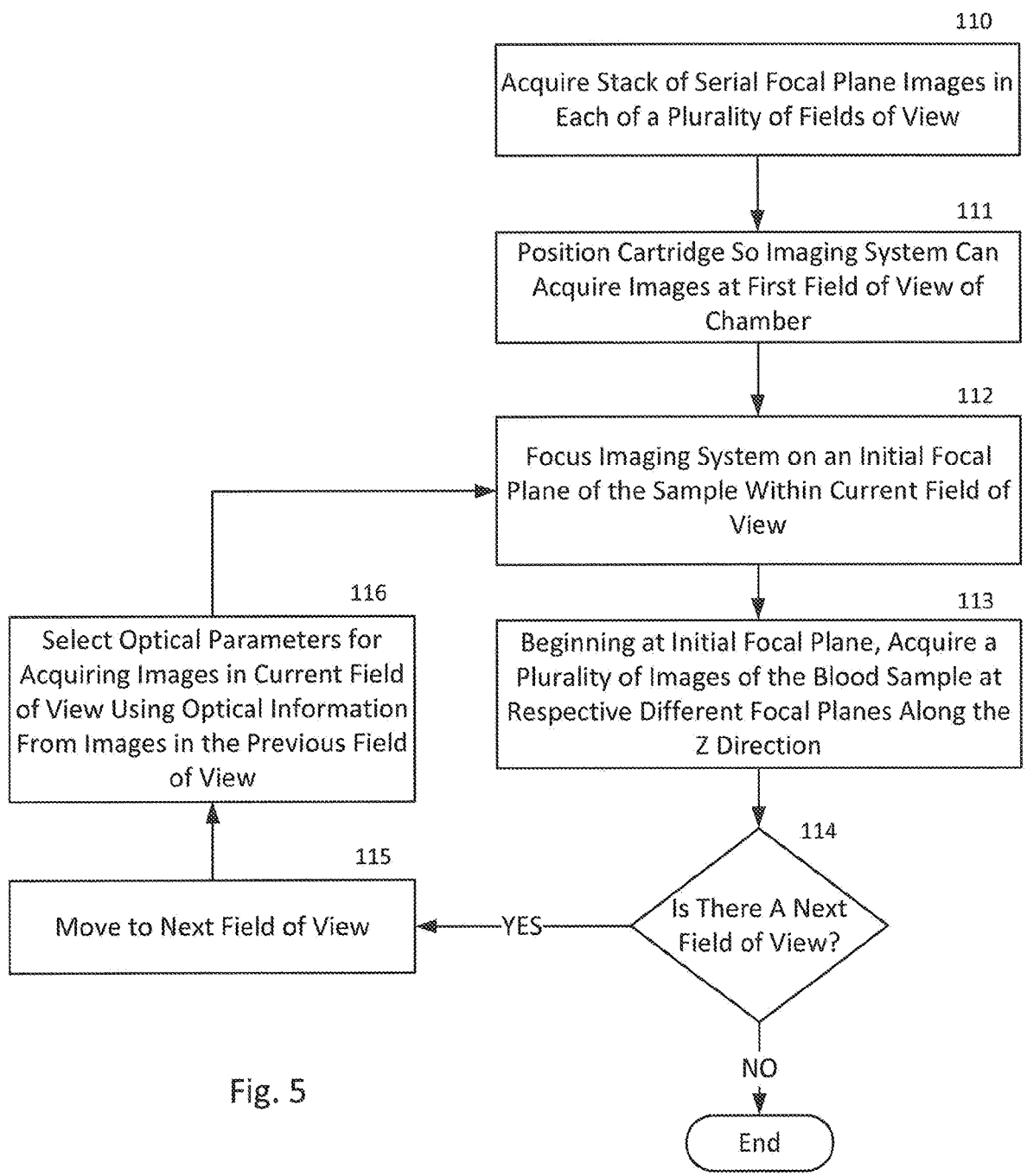
FIG. 5 is a flow diagram of a method of acquiring a stack of images from each of a plurality of fields of view of a chamber of a microscope cartridge in accordance with some embodiments of the present invention.

Image acquisition at each FOV is illustrated in more detail in FIG. 5. At each FOV, the imaging system acquires a stack of images taken at respective focal planes along the Z direction, e.g., from the top of the chamber 42 to the bottom of the chamber 42, or from the bottom of the chamber 42 to the top of the chamber 42, or from a medial location of the chamber 42 and on both sides of this medial location. The XYZ drive assembly 30 is configured to move the cartridge 40 such that the imaging sensor can acquire images from a first FOV (Block 111). The imaging system autofocuses on an initial focal plane in the current FOV (Block 112) and then a series of images are acquired along the Z direction at different focal planes (Block 113). In some embodiments, the initial focal plane is an upper focal plane and the series of images are acquired along the Z direction at different focal planes moving downward. In some embodiments, a middle focal plane is an initial focal plane and the series of images are acquired along the Z direction at different focal planes around this middle focal plane. In some embodiments, the initial focal plane is a lower focal plane and the series of images are acquired along the Z direction at different focal planes moving upward.

Figure 6:
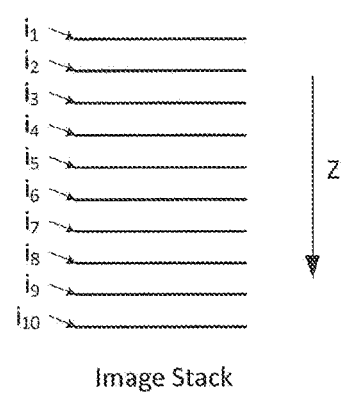
FIG. 6 is a schematic view of an image stack that includes a plurality of images acquired along the Z direction from a field of view of a chamber of a microscope cartridge.

FIG. 6 schematically illustrates a plurality of acquired images $i_1$-$i_{10}$ from different focal planes along the Z direction and are collectively referred to as an image stack. Various numbers of images in each FOV may be obtained, such as ten (10) images. However, various numbers of images may be acquired from each field of view without limitation. Moreover, different numbers of images may be acquired from different FOVs. Similarly, the Z datum for collecting the image stack in the current FOV may be dynamically altered based on analysis from previous FOVs, allowing the system to compensate for geometric imperfections like tilt. Image acquisition at each FOV is a continuous process and analysis of images in an acquired stack may occur while subsequent image stacks are being acquired.

Typically, the best-in-focus Z position is found for every FOV. This is done by calculating focus scores for various images at different planes in the Z stack, then using those (Z, focus score) pairs to estimate best focal Z for that stack. This is done for every FOV, and as FOVs are analyzed, the system accumulates (X,Y,Z) triplets of best focus that are used to feed a planar fit representing the Z datum for subsequent FOVs.

Figure 10:
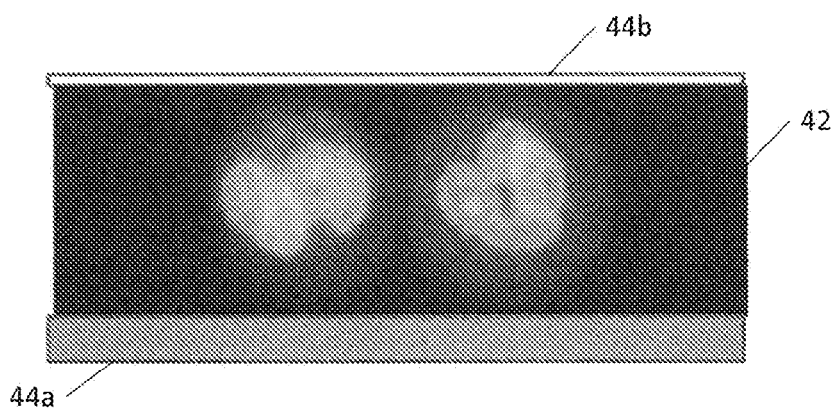
FIG. 10 is a cross-sectional view of a portion of a chamber of a cartridge illustrating blood formed elements therein.
Figure 11:
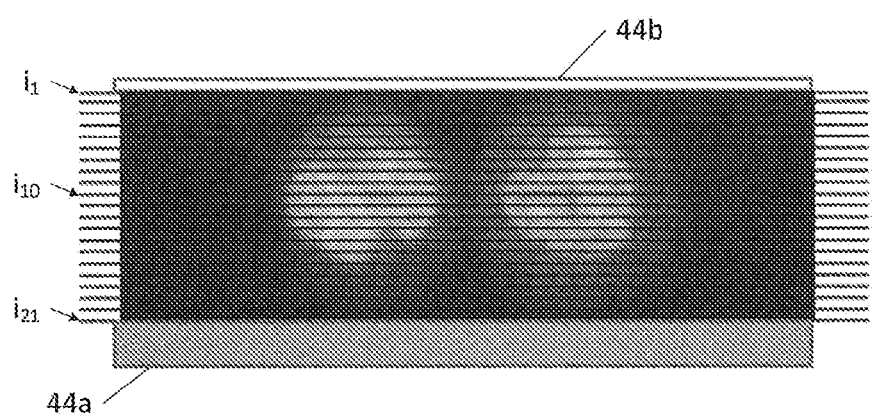
FIG. 11 schematically illustrates a plurality of images taken along the Z direction of the chamber illustrated in FIG. 10.

FIG. 10 is a cross-sectional view of a portion of a chamber 42 of a cartridge illustrating blood cells therein. FIG. 11 schematically illustrates a plurality of images that are taken along the Z direction of the chamber illustrated in FIG. 10. In FIG. 11, twenty one images ($i_1$-$i_{21}$) are indicated as being acquired.

Figure 8:
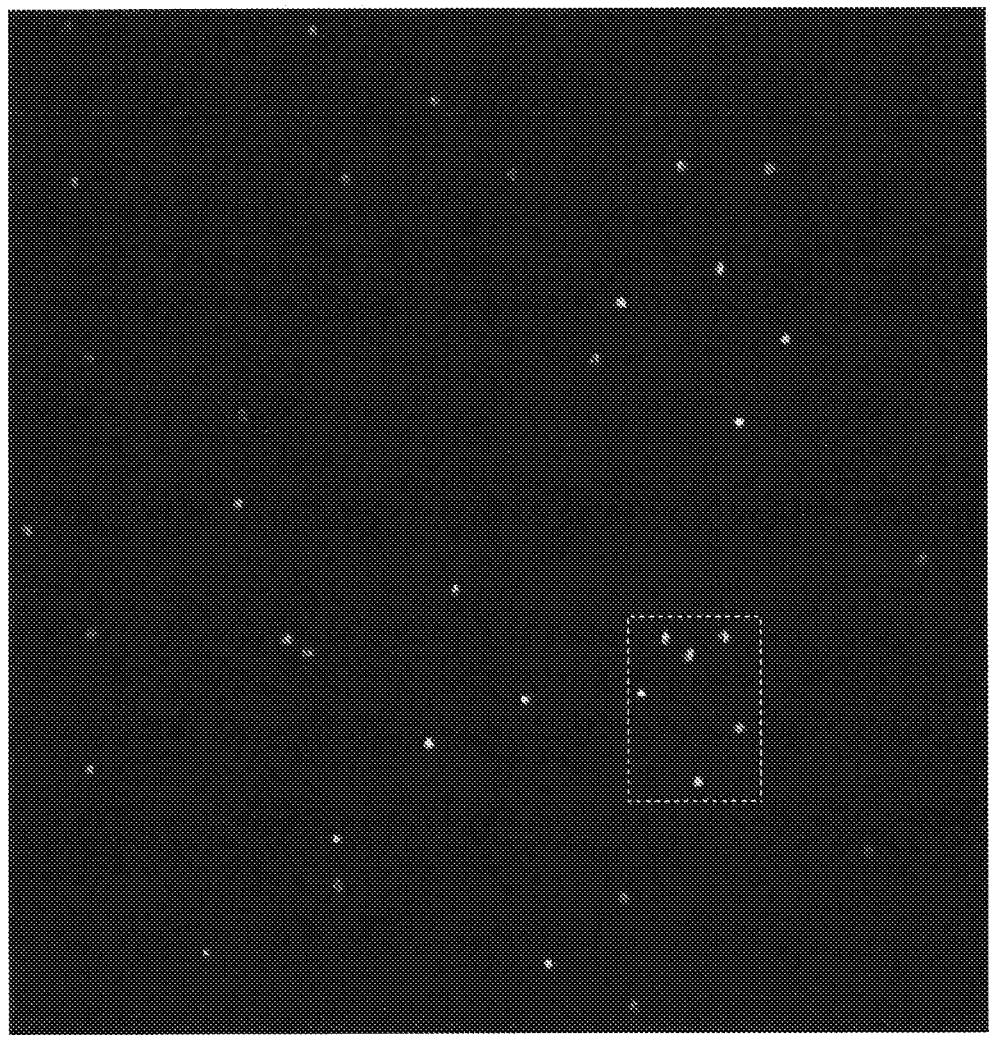
FIG. 8 is an image of a blood sample within a chamber of a cartridge according to embodiments of the present invention and illustrating blood cells therein.
Figure 9:
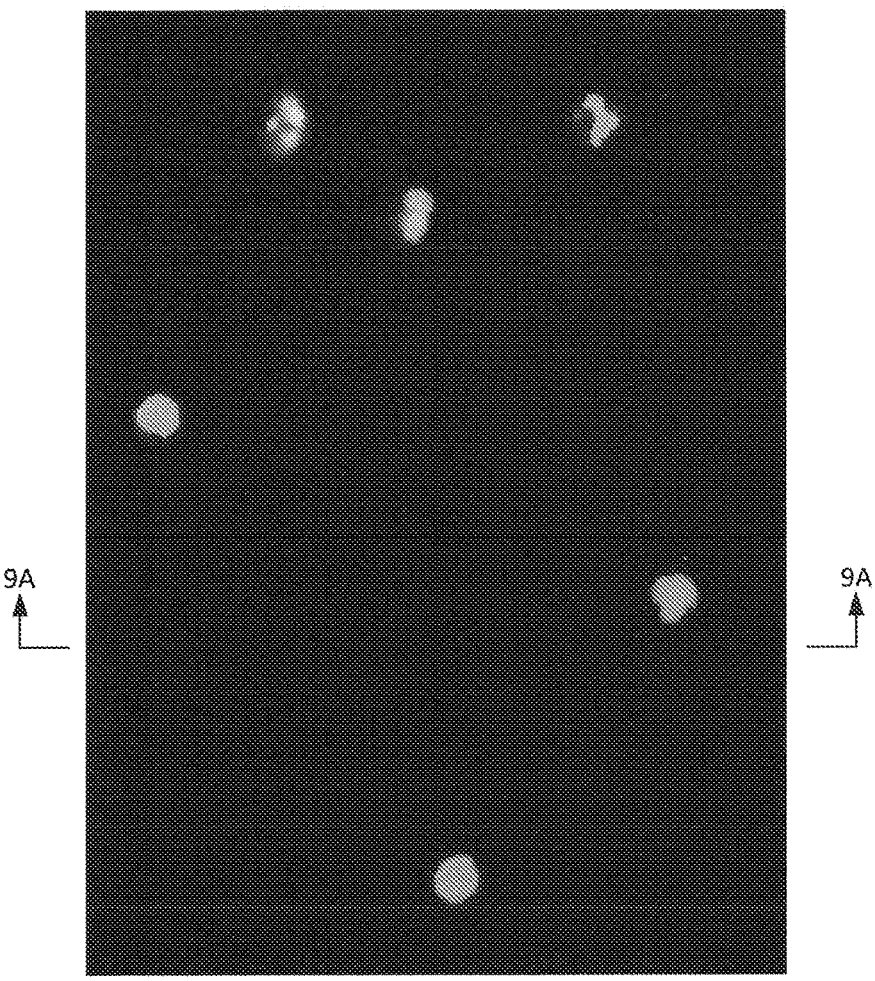
FIG. 9 is an enlarged view of a portion of the image of FIG. 8.
Figure 9A:
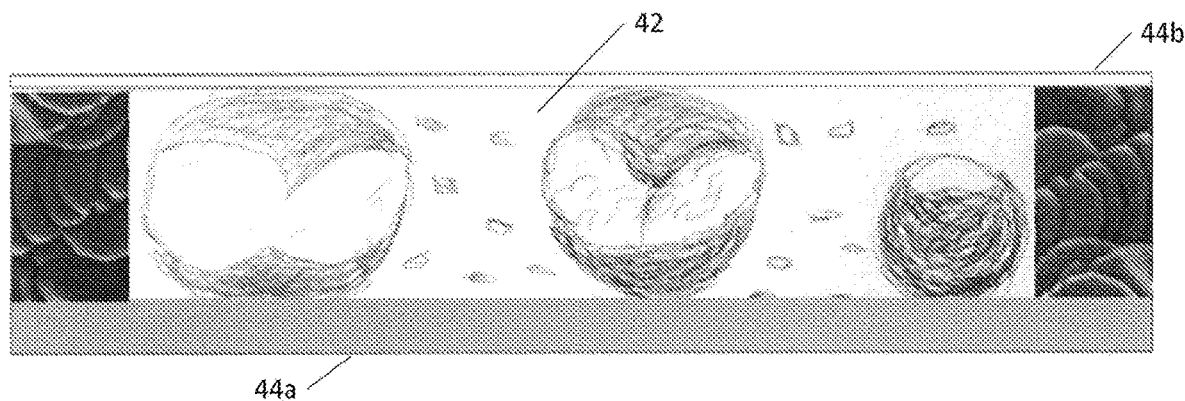
FIG. 9A is a cross-sectional view of FIG. 9 taken along line 9A-9A.

Referring to FIG. 8, an image of a blood sample within a chamber 42 of a cartridge 40 is illustrated. Blood formed elements are visible within the image. FIG. 9 is an enlarged view of the indicated portion of the image of FIG. 8 and shows blood formed elements, e.g., blood cells in greater detail. FIG. 9 is what the camera sees as images are acquired along the Z direction at that location of the blood sample. FIG. 9A is a cross-sectional view of the image of FIG. 9 as indicated and shows that the diameter of one of the illustrated cells in FIG. 9 (i.e., the leftmost cell) is larger than the height of the chamber 42. As such, this leftmost cell is slightly deformed as illustrated in FIG. 9A. The cell that is second from the left has a diameter that is the same as the height of the chamber 42, and the remaining cell has a respective diameter that is smaller than the height of the chamber 42. This information is utilized when constructing the virtual three dimensional image of the cells in a blood sample. Having images at multiple focal planes in a FOV allows for an accurate determination of cell size as well as an accurate determination of the structure of the nucleus of a cell. FIG. 9A also illustrates platelets and red cells in the form of rouleaux.

In some embodiments, images are saved within a raw Bayer pattern, one value per pixel. The advantages of such image acquisition include reducing disk space for storage and enhanced compression. As would be understood by one of skill in the art, a Bayer pattern dedicates more pixels to green than to red and blue, because the human eye is more sensitive to green. The additional green pixels produce a better color image.

Once a stack of images is acquired from a FOV, a determination is made if there is a next FOV from which to acquire images (Block 114). If the answer is no, operations end. If the answer is yes, the cartridge 40 is positioned such that the imaging system can acquire images from the next FOV according to the predetermined pattern P (Block 115). In addition, optical parameters for acquiring a stack of images in a current FOV may be selected using optical information from the previous FOV (Block 116). For example, parameters such as exposure time, camera gains, and illumination intensity for a current FOV may be selected using optical information from the previous FOV. As such, embodiments of the present invention provide a closed loop method of identifying optimal exposure time, focus and the like while acquiring image stacks from the FOVs. This facilitates determining the optimal brightness needed to identify objects of interest within the blood sample.

The imaging system proceeds to acquire stacks of images from each FOV for the chamber 42. Once stacks of images are acquired from each FOV, image stacks from one or more of the FOVs may be discarded. For example, FOVs at the edges of the chamber may be discarded because illumination or other optical properties of the acquired images are below a threshold standard, such as uniformity. Image stacks from other FOVs may be discarded because the stain within the chamber at the particular location of the FOV did not perform its function adequately, etc.

The stacks of images from the remaining FOVs are then used to create a virtual three dimensional image of the blood sample (Block 120, FIG. 1). The virtual three dimensional image is created via one or more processors associated with the portable automated microscope apparatus 5. The three dimensional image is then analyzed to identify blood formed elements within the blood sample (Block 130). The three dimensional image is configured to trace objects through the image stacks and can be done for specific blood formed elements. The three dimensional image is also created using artificial intelligence (AI) and machine vision segmentation to identify objects from the background in the image stacks. In some embodiments, an AI engine may be given the number of cells of each kind in a blood sample in order to enhance the identification of cells. Moreover, the AI engine can be trained to use different images within a stack to identify types of cells and other formed elements.

Furthermore, each of the cell components (membrane, nuclear DNA, cytoplasm and granules) has different fluorescence emission spectra which depend on their chemical composition and their reactivity with the metachromatic stain(s) in the chamber. Accordingly, the emitted fluorescence of cytoplasm, DNA, membrane and granules will be seen differently by each of the RGB channels of the camera 54. The relatively large numerical aperture of the camera 54 provides relatively high resolution, but because depth of focus also changes with wavelength the plane of perfect focus will depend not only on the Z location of every XY location but on the wavelength of the emitted fluorescence, and it will be different for each of the RGB channels. Therefore, each XY location for each RGB channel of every stacked image carries information on a cell's XYZ location as well as the cell's chemical composition. Moving continuously along the Z direction while capturing a series of stacked images creates a pattern of locations along the Z direction going in and out of focus independently in each of the RGB images, based on their XYZ location and their chemical composition represented by their fluorescence wavelengths. These unique patterns from all three RGB channels are independently fed to a convolutional neural network to create the virtual three dimensional image, which can provide enhanced cell identification capabilities including neutrophils, lymphocytes, monocytes, eosinophils, basophils, plus specific identification of earliest immature neutrophils (bands), metamyelocytes, myelocytes and blasts. It should be noted that, unlike embodiments of the present invention, conventional hematology analyzers are unable to quantitate bands as they are too similar to mature PMNs.

Once blood formed elements are identified within the blood sample, one or more processors of the portable automated microscope apparatus use the blood formed element information to determine a likelihood that the patient has an infection and a severity of the infection (Block 140). Results of blood formed element identification and infection determination may be displayed on a display device of the apparatus 5. Results may additionally be transmitted to another device and/or to a cloud-based data storage system when internet access is available for record keeping and further data analysis.

A portable microscope apparatus according to embodiments of the present invention can operate within or without cloud access. A portable microscope apparatus according to embodiments of the present invention is fully functional as a self-contained apparatus and can be used in circumstances where network/cloud access is limited, e.g., in ambulances, remote locations, etc.

In addition, in some embodiments, images of individual cells can be shown on a display, potentially eliminating the need to prepare a manual smear, as done in pathology labs today. This facilitates a "review on the spot". In addition, some embodiments of the present invention may include a built-in examination tool (e.g., a "markup tool"). Such a markup tool is software that permits a triage person or other medical professional to request a view of any one of multiple cells of interest to verify that the cells of interest have in fact been accurately identified by the portable automated microscope apparatus. For example, the combination of 10% bands, tachycardia and confusion may be quite serious and the triage person may want to verify the identified bands are indeed bands to support a management decision about a subject being tested.

According to other embodiments, machine learning may be utilized to determine the best chamber volume for a particular blood sample. For example, a small chamber volume may possibly lead to inaccuracy in white blood cell count. It would be desirable to determine the specific chamber volume that enables highest accuracy for WBC count. Individual cell quantities are reported as percent of total, as well as number per unit volume (typically µl). If the number used for the total volume of the chamber 42 is incorrect, then the number per microliter will be incorrect. According to embodiments of the present invention, the use of image stacks in combination with convolutional neural networks allows for a determination of the actual volume of the chamber 42.

The methods and devices of the present invention provide several advantages over prior hematology analyzers. The methods identify and quantify a larger number of cell types than previous methods, including neutrophils, lymphocytes, monocytes, eosinophils, basophils, platelets, and red blood cells (hematocrit). Importantly, the methods of the invention identify and quantify immature white blood cells, e.g., bands, including band neutrophils, band lymphocytes, band monocytes, band eosinophils, and band basophils. The methods also identify and quantify all immature granulocytes, including band neutrophils, metamyelocytes, myelocytes, and blasts. The methods also identify and quantify nucleated red cells as well as determine hematocrit.

Figure 12:
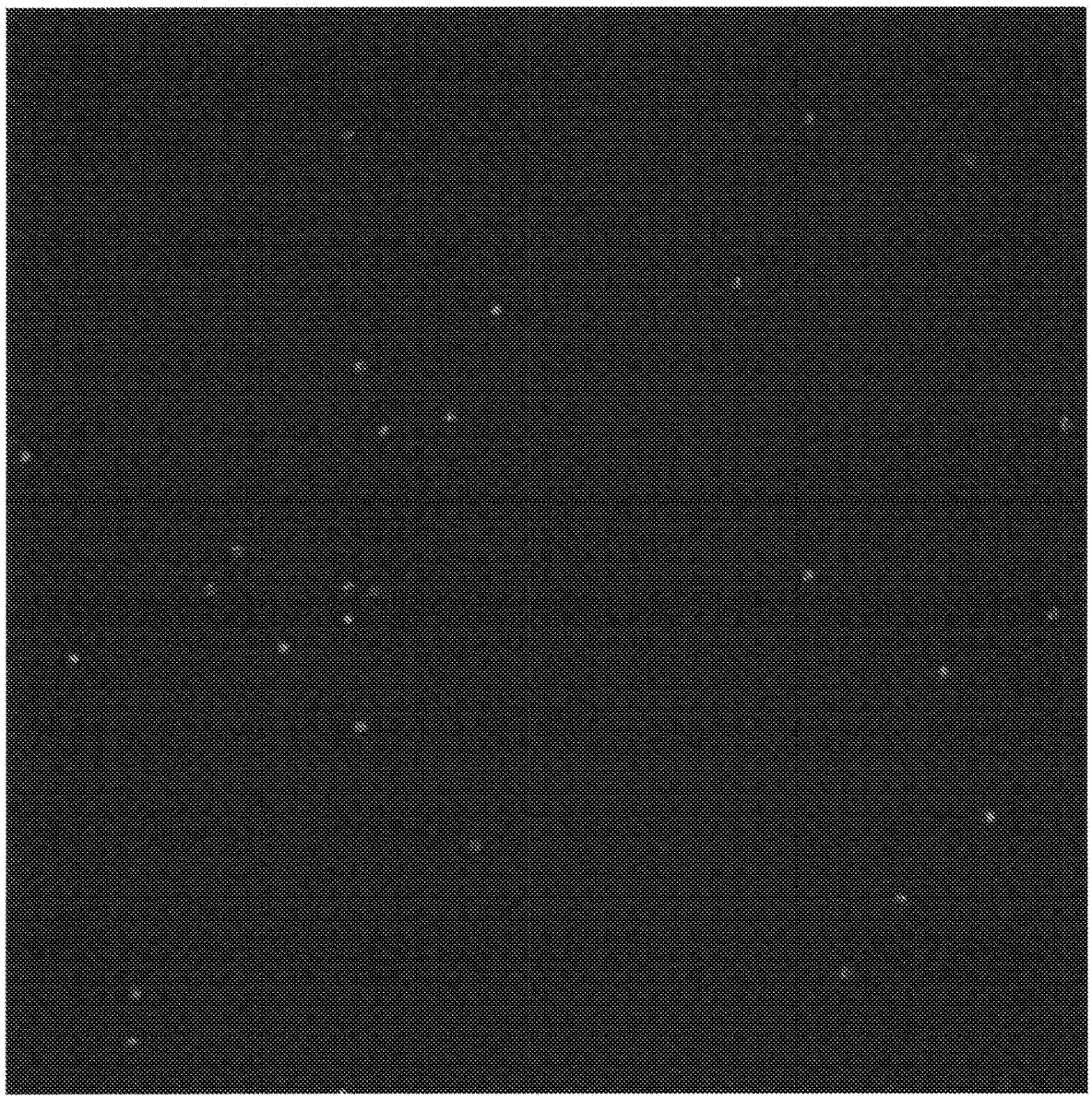
FIG. 12 illustrates an image of a chamber containing a blood sample wherein the image only shows white blood cells.
Figure 13:
FIG. 13 illustrates the image of FIG. 12 wherein the brightness has been changed in accordance with embodiments of the present invention such that platelets and hematocrit are visible.

The methods of the invention involve tracing of the surface of cells and nuclei in a sample to construct 3-dimensional images of the shape of the cell and nucleus from multiple 2-dimensional images, enabling accurate identification of cell type. It is the ability to detect immature white blood cells, along with the absolute counts, percentages, and ratios of the cells, that allows the method to detect likelihood of infection as well as the likelihood that the infection will lead to severe symptoms. Further, the methods of the invention are carried on small samples of whole blood (<10 µl) and rely on imaging without the need for additional steps and reagents such as measurement of cell surface markers or cell lysis. Additionally, the methods are carried out in a single chamber, first identifying and quantifying white blood cells and then changing the imaging conditions (e.g., brightness) to detect and quantify platelets and determine hematocrit. For example, FIG. 12 illustrates an image of a chamber containing a blood sample wherein the image only shows white blood cells. FIG. 13 illustrates the image of FIG. 12 wherein the brightness has been changed in accordance with embodiments of the present invention such that platelets and hematocrit are visible.

In addition, to increase in the types of cells identified and quantified, the present methods advantageously can be carried out quickly (less than 2 minutes) using a self-contained portable device that can be brought to the subject at any location and can be operated by non-clinicians to obtain critical information for triaging patients, monitoring treatment effectiveness, screening populations for spread of infection, and other uses.

The thorough evaluation of blood formed elements in the sample allows one to determine the likelihood that the subject from which the sample was obtained currently has an infection and, additionally, whether the infection is likely to result in severe symptoms. An ongoing infection in a subject results in signature patterns of blood formed element absolute numbers, percentages, and ratios. Detection of these patterns provides valuable information about the presence of the infection and its likely severity.

For example, SARS-CoV2 infection produces lymphocytopenia in greater than 80% of patients that tested positive for COVID-19 (Guan et al., New Eng. J. Med. 382:1708 (2020), incorporated by reference herein in its entirety). This measurement provides a diagnostic accuracy equivalent to a CT scan without the time, cost, and need for facilities and healthcare professionals. A finding of lymphocytopenia detected by the present invention indicates that the subject is likely to be positive for COVID-19. Furthermore, the neutrophil to lymphocyte ratio (NLR) has been shown to be the most significant factor for predicting severe illness in COVID-19 patients, e.g., indicative of the likelihood that the subject will have severe symptoms that will result in the need for intensive care and/or placement on a ventilator (Liu et al., medRxiv preprint, doi.org/10.1101/2020.02.10.20021584 (2020), incorporated by reference herein in its entirety). Thus, the present methods may be used not only to determine subjects that are likely to be positive for COVID-19 but also flag subjects that should be monitored more carefully and/or treated more urgently, e.g., admitted to the intensive care unit. This triage method is invaluable during a pandemic when emergency rooms are overwhelmed with the number of patients. Further, the methods can be carried out before subjects arrive at the hospital, e.g., at home or in the ambulance, to help manage patients, e.g., to determine which patients should be brought to the hospital and which patients can safely quarantine at home.

In addition to triage, the methods of the invention may also be used for patients admitted to the hospital or other medical facilities, e.g., for monitoring of recovery from the infection or the effectiveness of therapy. A change in the blood cell pattern towards the pattern for a non-infected subject may be indicative of recovery and guide further management of the subject, e.g., a decrease in therapy, stopping therapy, removal from a ventilator, transfer from the ICU to the general ward, release from the hospital, etc.

The methods of the invention may also be used for patients that have been discharged from the hospital or are in post-recovery settings, e.g., to identify signs of relapse or worsening conditions that may need follow-up or to return to the hospital.

The methods of the invention can be used to track the spread of an infectious agent. For example, the methods may be carried out in a population (e.g., in a nursing home, meat packing plant, barracks, dormitory, school, stadium) to provide rapid evidence of infected subjects. The methods may be carried out repeatedly, e.g., daily or weekly, to prevent or slow spread of the infection. Further, because the methods may be carried out by a non-clinician, the methods provide a quick and inexpensive way to control the risk of infection.

The methods of the invention also can be used to track the health status of subject at home or otherwise outside a doctor's office or medical facility. As the methods may be carried out by those without healthcare training, the methods can be used for home-based monitoring and early notification of health issues such as an infection, e.g., as part of a telemedicine program. The methods may provide an indication of when in-person medical examination is needed or when a subject should go to a medical facility for treatment.

While the above example is for SARS-CoV2 infection, the methods are applicable to other infectious agents, including viruses, bacteria, and other pathogens, that cause infectious diseases, each of which may produce a signature blood cell pattern that can be detected by the present methods and provide the information needed for decision making and management of patients.

The term "infectious diseases," as used herein, refers to any disease associated with infection by an infectious agent. Examples of infectious agents include, without limitation, viruses and microorganisms. Viruses include, without limitation, Hepadnaviridae including hepatitis A, B, C, D, E, F, G, etc.; Flaviviridae including human hepatitis C virus (HCV), yellow fever virus and dengue viruses; Retroviridae including human immunodeficiency viruses (HIV) and human T lymphotropic viruses (HTLV1 and HTLV2); Herpesviridae including herpes simplex viruses (HSV-1 and HSV-2), Epstein Barr virus (EBV), cytomegalovirus, varicella-zoster virus (VZV), human herpes virus 6 (HHV-6) human herpes virus 8 (HHV-8), and herpes B virus; Papovaviridae including human papilloma viruses; Rhabdoviridae including rabies virus; Paramyxoviridae including respiratory syncytial virus; Reoviridae including rotaviruses; Bunyaviridae including hantaviruses; Filoviridae including Ebola virus; Adenoviridae; Parvoviridae including parvovirus B-19; Arenaviridae including Lassa virus; Orthomyxoviridae including influenza viruses; Poxviridae including Orf virus, molluscum contageosum virus, smallpox virus and Monkey pox virus; Togaviridae including Venezuelan equine encephalitis virus; Coronaviridae including corona viruses such as the severe acute respiratory syndrome (SARS) virus; and Picornaviridae including polioviruses; rhinoviruses; orbiviruses; picodnaviruses; encephalomyocarditis virus (EMV); Parainfluenza viruses, adenoviruses, Coxsackieviruses, Echoviruses, Rubeola virus, Rubella virus, human papillomaviruses, Canine distemper virus, Canine contagious hepatitis virus, Feline calicivirus, Feline rhinotracheitis virus, TGE virus (swine), Foot and mouth disease virus, simian virus 5, human parainfluenza virus type 2, human metapneumovirus, enteroviruses, and any other pathogenic virus now known or later identified (see, e.g., *Fundamental Virology*, Fields et al., Eds., 3rd ed., Lippincott-Raven, New York, 1996, the entire contents of which are incorporated by reference herein for the teachings of pathogenic viruses).

Pathogenic microorganisms include, but are not limited to, *Rickettsia, Chlamydia,* Mycobacteria, Clostridia, Corynebacteria, *Mycoplasma, Ureaplasma, Legionella, Shigella, Salmonella,* pathogenic *Escherichia coli* species, *Bordetella, Neisseria, Treponema, Bacillus, Haemophilus, Moraxella, Vibrio, Staphylococcus* spp., *Streptococcus* spp., *Campylobacter* spp., *Borrelia* spp., *Leptospira* spp., *Ehrlichia* spp., *Klebsiella* spp., *Pseudomonas* spp., *Helicobacter* spp., and any other pathogenic microorganism now known or later identified (see, e.g., *Microbiology*, Davis et al, Eds., 4$^{th}$ ed., Lippincott, New York, 1990, the entire contents of which are incorporated herein by reference for the teachings of pathogenic microorganisms). Specific examples of microorganisms include, but are not limited to, *Helicobacter pylori, Chlamydia pneumoniae, Chlamydia trachomatis, Ureaplasma urealyticum, Mycoplasma pneumoniae, Staphylococcus aureus, Streptococcus pyogenes, Streptococcus pneumoniae, Streptococcus viridans, Enterococcus faecalis, Neisseria meningitidis, Neisseria gonorrhoeae, Treponema pallidum, Bacillus anthracis, Salmonella typhi, Vibrio cholera, Pasteurella pestis (Yersinia pestis), Pseudomonas aeruginosa, Campylobacter jejuni, Clostridium difficile, Clostridium botulinum, Mycobacterium tuberculosis, Borrelia burgdorferi, Haemophilus ducreyi, Corynebacterium diphtheria, Bordetella pertussis, Bordetella parapertussis, Bordetella bronchiseptica, Haemophilus* influenza, and enterotoxic *Escherichia coli*.

The methods of the invention may be used to determine the likelihood of sepsis in an infected subject and/or the likely of severe symptoms of sepsis. Elevated band neutrophils, elevated band eosinophils, and thrombocytopenia are all markers of sepsis, and identification of subjects with the same may indicate that the subject should by monitored for sepsis. A combination of two or more sepsis markers may be an indication of increased severity. Given that sepsis severity can increase rapidly, the present methods may be used as a rapid triage method, e.g., in the emergency room, to identify subjects that should not be sent home from the hospital but instead should be monitored for rapid worsening of symptoms.

Thus, one aspect of the invention relates to a method of managing a subject suspected of having an infection, comprising:
 a) carrying out the blood analysis method of the invention;
 b) classifying the subject as:
  1) unlikely to have an infection;
  2) likely to have an infection; or
  3) likely to have an infection with severe symptoms
  based on the results of step a); and
 c) managing the subject based on the results of step b).

Another aspect of the invention relates to a method of managing a subject suspected of having a SARS-CoV2 infection, comprising:
 a) carrying out the blood analysis method of the invention;
 b) classifying the subject as:
  1) unlikely to have a SARS-CoV2 infection;
  2) likely to have a SARS-CoV2 infection; or
  3) likely to have a SARS-CoV2 infection with severe symptoms
  based on the results of step a); and
 c) managing the subject based on the results of step b).

A further aspect of the invention relates to a method of managing a subject suspected of having sepsis, comprising:
 a) carrying out the blood analysis method of the invention;
 b) classifying the subject as:
  1) unlikely to have sepsis;
  2) likely to have sepsis; or
  3) likely to have sepsis with severe symptoms
  based on the results of step a); and
 c) managing the subject based on the results of step b).

The term "managing a subject," as used herein, refers to determining and carrying out the appropriate medical treatment of the subject. Examples of management decisions and steps include, without limitation, sending or keeping the subject home, e.g., with specific instructions of symptoms to watch out for and to return to the emergency room if they appear, continuing monitoring of the subject, e.g., for a few hours, starting intravenous fluids and/or oxygen treatment, performing additional tests on the subject and, optionally, sending the subject home with orders to contact the subject depending on the results of the tests, transporting or airlifting the subject to a hospital, admitting the subject to a hospital, or admitting the subject to a hospital intensive care unit. For possible sepsis patients, additional steps may include classifying a subject as having potential sepsis or possible sepsis, referring the subject over to a sepsis coordinator, or ordering specific confirmatory tests such as lactate or procalcitonin measurements.

The term "severe symptoms," as used herein, refers to infection symptoms that require treatment in a hospital, e.g., urgent treatment. Examples include, without limitation, breathing difficulties, organ dysfunction, highly elevated fever, severe tachycardia, low systolic blood pressure, or confusion.

An additional aspect of the invention relates to a method of managing a subject having an infection, comprising:
a) carrying out the blood analysis method of the invention at least two times;
b) classifying the subject as:
1) no change in the infection;
2) improving of the infection; or
3) worsening of the infection
based on the results of step a); and
c) managing the subject based on the results of step b).

A further aspect of the invention relates to a method of managing a subject having a SARS-CoV2 infection, comprising:
a) carrying out the blood analysis method of the invention at least two times;
b) classifying the subject as:
1) no change in the SARS-CoV2 infection;
2) improving of the SARS-CoV2 infection; or
3) worsening of the SARS-CoV2 infection
based on the results of step a); and
c) managing the subject based on the results of step b).

Another aspect of the invention relates to a method of managing a subject having sepsis, comprising:
a) carrying out the blood analysis method of the invention at least two times;
b) classifying the subject as:
1) no change in the sepsis;
2) improving of the sepsis; or
3) worsening of the sepsis
based on the results of step a); and
c) managing the subject based on the results of step b).

The methods of testing a subject having an infection or sepsis may be carried out by using the methods of the invention two or more times (e.g., 2, 3, 4, 5, 6, 7, 8, 9, or 10 or more times) to monitor for changes in the blood cell pattern of the subject. The methods may be repeated at any time interval, e.g., every 1, 2, 3, 4, 5, 6, 9, 12, 18, or 24 hours or more. Examples of management decisions and steps for current patients include, without limitation, maintaining current treatment, changing treatment (increasing or decreasing), ending treatment, transferring the patient from the ICU to the general ward or from the general ward to the ICU, or releasing the patient from the hospital.

An additional aspect of the invention relates to a method of monitoring a subject for a potential infection, comprising:
a) carrying out the blood analysis method of the invention;
b) classifying the subject as:
1) unlikely to have an infection;
2) likely to have an infection; or
3) likely to have an infection with severe symptoms
based on the results of step a); and
c) managing the subject based on the results of step b).

In some embodiments, the subject is a healthy subject, e.g., having no symptoms of an infection. In some embodiments, the subject is one that has been exposed or may have been exposed to an infectious subject. In some embodiments, the subject is part of a population where it is desirable to slow or prevent spread of an infection, e.g., nursing home patients. The methods may be repeated at any time interval for continuous monitoring, e.g., every 1, 2, 3, 4, 5, 6, 9, 12, or 18 hours or every 1, 2, 3, 4, 5, 6, or 7 days or more.

A further aspect of the invention relates to a method of carrying out a hematology screen of a subject prior to a medical procedure, comprising:
a) carrying out the blood analysis method of the invention;
b) classifying the subject as:
1) suitable for the medical procedure; or
2) unsuitable for the medical procedure
based on the results of step a); and
c) carrying out the medical procedure if the subject is classified as suitable.

The methods may be used where a hematology screen is routinely done to ensure a subject has a "normal" blood cell count and can proceed with a medical procedure, e.g., chemotherapy or surgery.

For each of the above methods, steps a) and b) combined may be carried out in less than 120 seconds, e.g., less than 105, 90, 75, 60, 45, or 30 seconds.

For each of the above methods, step a) does not comprise the use of cell surface markers and the method does not comprise a step of cell lysis.

Each of the above methods may further comprise incorporating the results of additional tests, factors, or measurements as appropriate for determining the likelihood of infection, sepsis, severity, etc. Examples of additional tests, factors, or measurements include, without limitation, blood oxygen level, temperature, organ function measurements, lactate, procalcitonin, alertness, confusion, agitation, tachycardia, systolic blood pressure, age, body mass index, comorbidities, etc.

Suitable subjects include mammals. The term "mammal" as used herein includes, but is not limited to, humans, primates, non-human primates (e.g., monkeys and baboons), cattle, sheep, goats, pigs, horses, cats, dogs, rabbits, rodents (e.g., rats, mice, hamsters, and the like), etc. Human subjects include neonates, infants, juveniles, and adults. Optionally, the subject is "in need of" the methods of the present invention, e.g., because the subject has or is believed at risk for an infection or a disorder associated with an infection (e.g., sepsis) including those described herein. Optionally, the subject is a pediatric or neonatal patient and/or the disorder may be one associated with pediatric or neonatal patient, e.g., multisystem inflammatory syndrome in children (MIS-C).

A portable automated microscope apparatus according to embodiments of the present invention, or any part(s) or function(s) thereof, may be implemented using hardware, software or a combination thereof and may be implemented in one or more computer systems or other processing systems. Many of the operations may be machine operations or may be conducted or enhanced by AI or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

Various embodiments of the present invention utilize one or more computer systems capable of carrying out the functionality described herein. The computer system(s) includes one or more processors, and can include a display interface that forwards graphics, text, and other data from a communication infrastructure or from a frame buffer (not shown) for display on a display unit.

Figure 7:
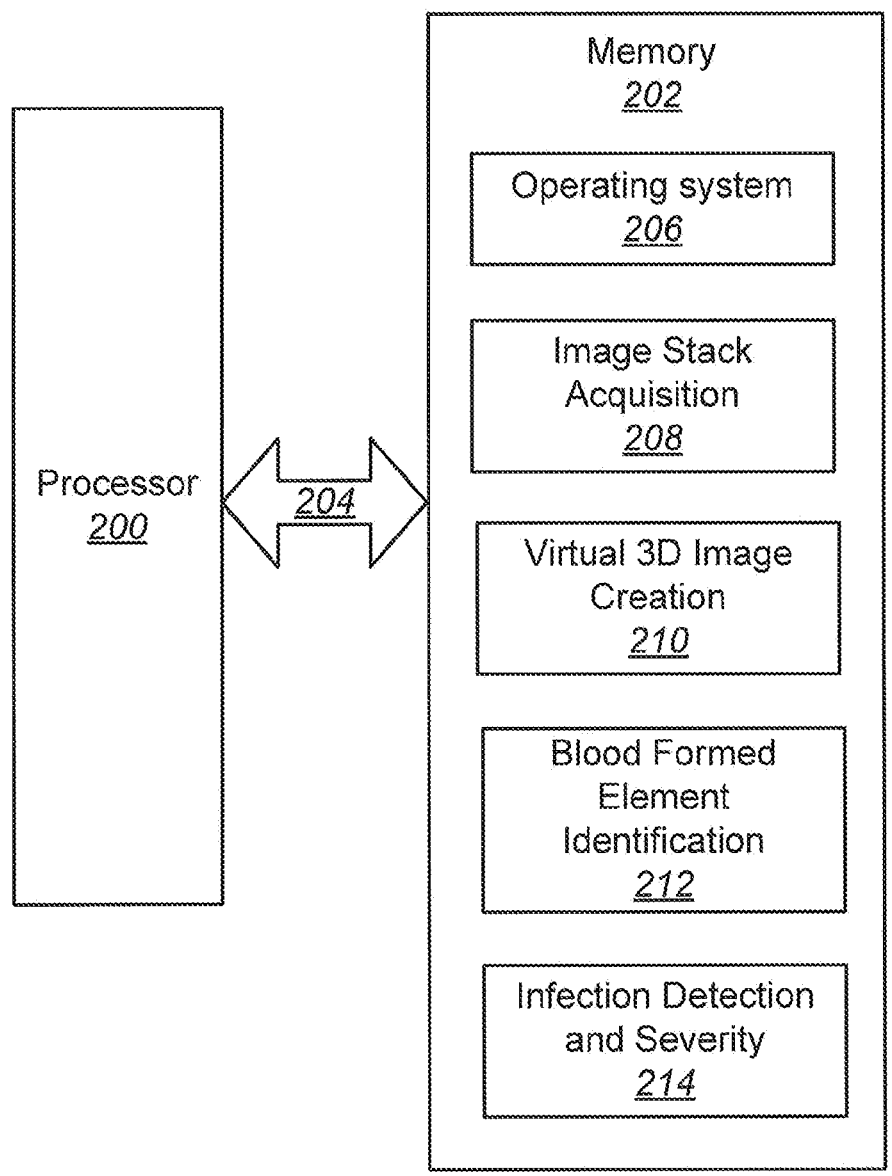
FIG. 7 illustrates an exemplary processor and memory of a data processing system that may be used to implement the functions of a portable automated microscope apparatus according to some embodiments of the present invention.

FIG. 7 illustrates an exemplary processor 200 and memory 202 that is representative of data processing systems that may be used to implement the functions of a portable automated microscope apparatus according to embodiments of the present invention. The processor 200 communicates with the memory 202 via an address/data bus 204. The processor 200 may be, for example, a commercially available or custom microprocessor. The memory 202 is representative of the overall hierarchy of memory devices containing the software and data used to implement various functions of the controller 80 as described herein. The memory 202 may include, but is not limited to, the following types of devices: cache, ROM, PROM, EPROM, EEPROM, flash, SRAM, and DRAM.

As shown in FIG. 7, the memory 202 may hold various categories of software and data: an operating system 206, an image stack acquisition module 208, a virtual three dimensional image creation module 210, a blood cell identification module 212, and an infection detection and severity module 214. The operating system 206 controls operations of one or more data processors that implement the methods performed by a portable automated microscope apparatus according to embodiments of the present invention. In particular, the operating system 206 may manage the resources of the portable automated microscope apparatus and may coordinate execution of various programs (e.g., the image stack acquisition module 208, the virtual three dimensional image creation module 210, the blood formed elements identification module 212, and the infection detection and severity module 214) by the processor 200.

The image stack acquisition module 208 comprises logic for acquiring, via the imaging system of the portable automated microscope apparatus, a stack of serial focal plane images of the blood sample in each of a plurality of fields of view of a chamber contained within a microscope cartridge as described above. The virtual three dimensional image creation module 210 comprises logic for creating a virtual three dimensional image of the blood sample from selected ones of the stacks of serial focal plane images as described above. The blood formed elements identification module 212 comprises logic for analyzing the virtual three dimensional image to identify blood formed elements within the blood sample as described above. The infection detection and severity module 214 comprises logic for using the blood formed elements identification information to determine the likelihood that the subject has an infection and a severity of the infection as described above.

As will be appreciated by one of ordinary skill in the art, a portable automated microscope apparatus or any of its components may be embodied as a customization of an existing system, an add-on product, a processing apparatus executing upgraded software, a standalone system, a distributed system, a method, a data processing system, a device for data processing, and/or a computer program product (i.e., an article of manufacture). Accordingly, any portion of a portable automated microscope apparatus or a module may take the form of a processing apparatus executing code, an internet-based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The portable automated microscope apparatus and methods are described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general-purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The term "non-transitory" is to be understood to remove only propagating transitory signals per se from the claim scope and does not relinquish rights to all standard computer-readable media that are not only propagating transitory signals per se. Stated another way, the meaning of the term "non-transitory, machine-readable memory", as used herein, should be construed to exclude only those types of transitory computer-readable media which were found in In Re Nuijten to fall outside the scope of patentable subject matter under 35 U.S.C. § 101.

The present invention is more particularly described in the following examples that are intended as illustrative only since numerous modifications and variations therein will be apparent to those skilled in the art.

Example 1

Three subjects living in the same home were exposed to a COVID-19 contact. Subject 1 showed mild symptoms.

COVID-19 tests were collected at a testing location and the subjects were sent home to quarantine and wait for results. The present method was used on the three subjects and produced results in 90 seconds. Subject 1 showed lymphocytopenia predictive of a positive result. Subjects 2 and 3 showed a normal lymphocyte count. Vitus tests results a few days later came back positive for subject 1 and negative for subjects 2 and 3.

The present method was repeated on subject 1, who was showing some symptoms of infection. The results showed elevated NLR but the values indicated the case would not be severe.

Daily monitoring was continued for all 3 subjects. Subject 1 did not deteriorate and subjects 2 and 3 continued to show normal lymphocyte counts and remained asymptomatic. Repeated testing of subject 1 with the present method showed an increase in lymphocyte count and a decrease in NLR, which correlated with the subject feeling better.

After 2 weeks the symptoms disappeared for subject 1 and the lymphocyte count and NLR returned to normal. For subjects 2 and 3 the lymphocyte count and NLR remained normal. All three subjects tested negative for virus. The results confirm the effectiveness of the present invention both for predicting infection and severity of infection.

Example 2

A 12-year-old boy showed up at the emergency room with minor cuts. No major issues were identified and the CBC found nothing abnormal. The attending physical suspected infection or possible sepsis and ordered a manual blood cell differential, which took several hours for results. In the meantime, the subject was sent home but returned to the emergency room 2 days later with severe symptoms and subsequently died of severe septic shock. When the manual blood cell differential results came in it showed 50% bands, predictive of severe sepsis. If the present invention has been available and utilized, the high band count could have been quickly detected and a life might have been saved by keeping the patient in the hospital and treating for sepsis.

Example 3

Observations of NLR in COVID-19 patients in China and in New York indicate an ability to risk stratify the patients. Generally, an NLR of <3 indicates low risk, >6 indicates patients that should be observed, 10-20 indicates patients that should be admitted to the ICU, and >20 indicates low odds of survival. Higher risk categories can be used to determine whether to move patients from a nasal cannula to a 100% oxygen face mask or to a ventilator. Further, decreases in NLR have been correlated with the ability to remove patients from a ventilator. The ability to measure NLR in less than 2 minutes with the present invention provides a substantial improvement over the hours needed for results from a manual blood cell differential.

Example 4

The methods of the present invention were applied to several hundred subjects waiting in line for a COVID-19 test at locations around the country. Blood samples were obtained and tested. Significant numbers (generally falling within a range of 2%10%) of subjects were determined to have lymphocytopenia. The percentage of lymphocytopenia correlated well with the ongoing percentage of COVID-19 positive subjects in the region of the testing.

Example 5

Figure 14A:
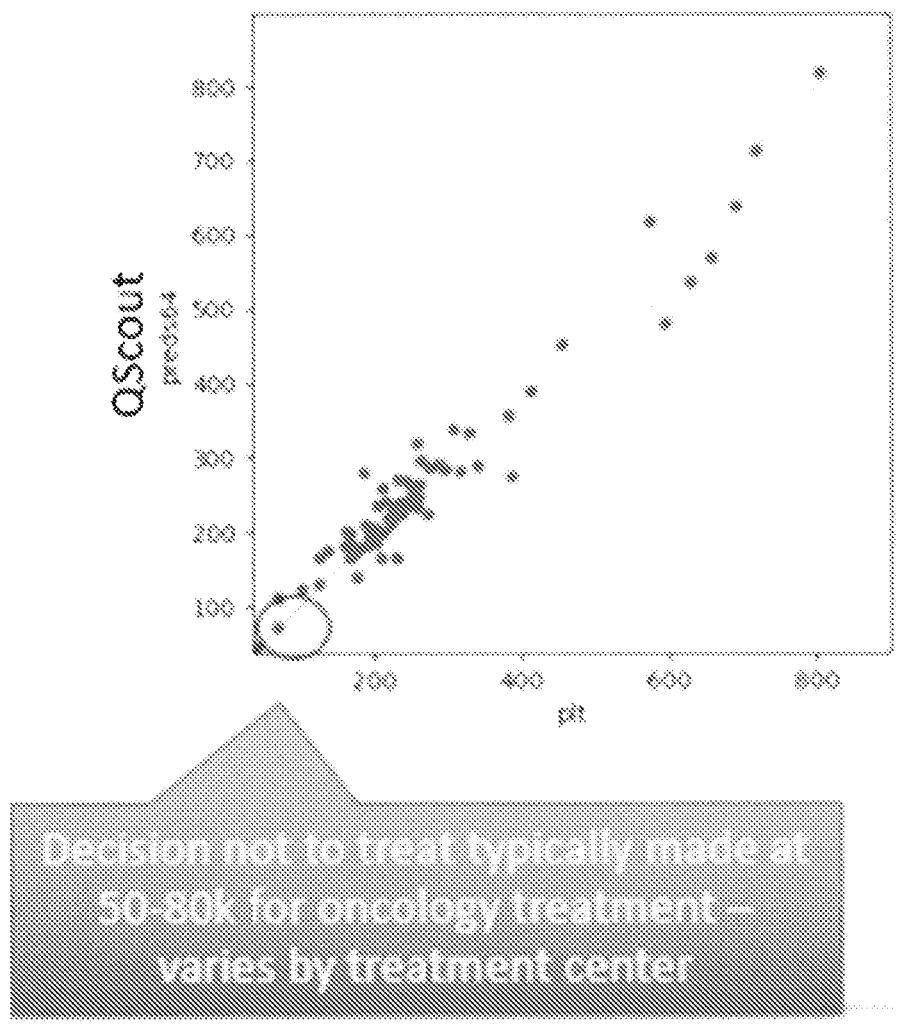
FIGS. 14A-14B illustrate blood analysis of cancer patients, showing platelets (FIG. 14A) and hematocrit (FIG. 14B).
Figure 14B:
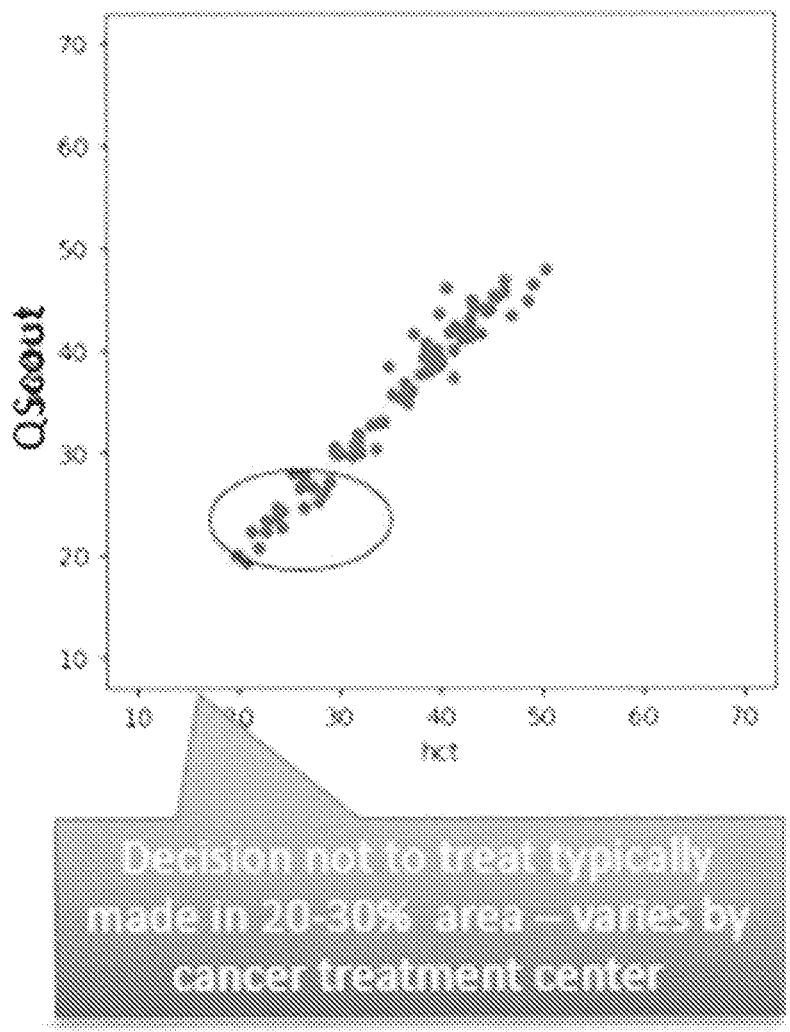

The methods of the present invention were applied to several dozen cancer patients undergoing a hematology screen prior to chemotherapy using a QScout device. The methods of the invention identified the platelet count (FIG. 14A) and hematocrit (FIG. 14A) of each patient, rapidly identifying those patients with low platelets (<50000-80,000) and low hematocrit (20-30%) that should not proceed with the chemotherapy (circled datapoints).

The foregoing is illustrative of the present invention, and is not to be construed as limiting thereof. The invention is defined by the following claims, with equivalents of the claims to be included therein.

That which is claimed is:

1. A method of analyzing a blood sample from a subject, the method comprising:
   loading the blood sample into a single chamber;
   acquiring, via an imaging system comprising a single camera, a stack of serial focal plane images of the blood sample from a plurality of fields of view of the chamber;
   creating a virtual three dimensional image of the blood sample from selected ones of the stacks of serial focal plane images; and
   analyzing the virtual three dimensional image to identify blood formed elements within the blood sample.

2. The method of claim 1, wherein analyzing the virtual three dimensional image to identify blood formed elements within the blood sample comprises identifying a type and amount of white blood cells.

3. The method of claim 1, wherein analyzing the virtual three dimensional image to identify blood formed elements within the blood sample comprises identifying an amount of red blood cells and/or hematocrit.

4. The method of claim 1, wherein analyzing the virtual three dimensional image to identify blood formed elements within the blood sample comprises identifying an amount of platelets.

5. The method of claim 1, wherein analyzing the virtual three dimensional image to identify blood formed elements within the blood sample comprises determining numbers and percentage by volume in the blood sample of one or more types of white blood cells.

6. The method of claim 5, wherein the one or more types of white blood cells are selected from the following: lymphocytes, neutrophils, eosinophils, basophils, monocytes, bands, and immature granulocytes.

7. The method of claim 6, wherein the immature granulocytes include band neutrophils, metamyelocytes, myelocytes, and blasts.

8. The method of claim 1, wherein analyzing the virtual three dimensional image to identify blood formed elements within the blood sample comprises determining a ratio in the blood sample of two or more types of blood formed elements.

9. The method of claim 8, comprising determining the ratio of neutrophils to lymphocytes.

10. The method of claim 5, further comprising using the determined numbers, percentage by volume, and ratios in the blood sample of the one or more types of blood formed elements to output relevant hematology measurands and clinical information, such as likelihood and severity of infection.

11. The method of claim 1, wherein acquiring the stack of serial focal plane images in each field of view comprises initially focusing the imaging system on a first focal plane of the blood sample within the respective field of view.

12. The method of claim 1, further comprising using optical information from at least one image in a stack of images of a first field of view to select optical parameters utilized during the acquiring of a stack of serial focal plane images in a second, subsequent field of view.

13. The method of claim 1, wherein the method is performed by a portable automated microscope apparatus at a location of the subject.

14. A method of managing a subject suspected of having an infection, comprising:
a) carrying out the method of claim 1;
b) classifying the subject as:
 1) unlikely to have an infection;
 2) likely to have an infection; or
 3) likely to have an infection with severe symptoms
 based on the results of step a); and
c) managing the subject based on the results of step b).

15. A method of managing a subject suspected of having a SARS-CoV2 infection, comprising:
a) carrying out the method of claim 1;
b) classifying the subject as:
 1) unlikely to have a SARS-CoV2 infection;
 2) likely to have a SARS-CoV2 infection; or
 3) likely to have a SARS-CoV2 infection with severe symptoms
 based on the results of step a); and
c) managing the subject based on the results of step b).

16. A method of managing a subject suspected of having sepsis, comprising:
a) carrying out the method of claim 1;
b) classifying the subject as:
 1) unlikely to have sepsis;
 2) likely to have sepsis; or
 3) likely to have sepsis with severe symptoms
 based on the results of step a); and
c) managing the subject based on the results of step b).

17. A method of monitoring a subject for a potential infection, comprising:
a) carrying out the method of claim 1;
b) classifying the subject as:
 1) unlikely to have an infection;
 2) likely to have an infection; or
 3) likely to have an infection with severe symptoms
 based on the results of step a); and
c) managing the subject based on the results of step b).

18. A method of carrying out a hematology screen of a subject prior to a medical procedure, comprising:
a) carrying out the method of claim 1;
b) classifying the subject as:
 1) suitable for the medical procedure; or
 2) unsuitable for the medical procedure
 based on the results of step a); and
c) carrying out the medical procedure if the subject is classified as suitable.

19. A portable apparatus, comprising:
a processor;
a hematology analyzer comprising a single camera, the hematology analyzer in communication with the processor; and
a tangible, non-transitory memory configured to communicate with the processor, the tangible, non-transitory memory having instructions stored thereon that, in response to execution by the processor, cause the processor to perform operations comprising:
 receiving from the hematology analyzer, a stack of serial focal plane images of a blood sample in a chamber from a plurality of fields of view of the chamber;
 creating a virtual three dimensional image of the blood sample from selected ones of the stacks of serial focal plane images; and
 analyzing the virtual three dimensional image to identify blood formed elements within the blood sample.

20. An article of manufacture, comprising:
a non-transitory, machine-readable memory having instructions recorded thereon that, when executed on a processor, cause the processor to perform operations comprising:
 receiving from a hematology analyzer comprising a single camera, a stack of serial focal plane images of a subject's blood sample in a chamber from a plurality of fields of view of the chamber;
 creating a virtual three dimensional image of the blood sample from selected ones of the stacks of serial focal plane images; and
 analyzing the virtual three dimensional image to identify blood formed elements within the blood sample.

* * * * *